(12) United States Patent
Niwa et al.

(10) Patent No.: US 7,168,709 B2
(45) Date of Patent: Jan. 30, 2007

(54) SUSPENSION CONTROL APPARATUS OF VEHICLE

(75) Inventors: Toshiaki Niwa, Okazaki (JP); Toshihiro Shiimado, Okazaki (JP); Nobuaki Miki, Okazaki (JP)

(73) Assignee: Aisin Aw Co., Ltd., Anjo (JP)

( * ) Notice: Subject to any disclaimer, the term of this patent is extended or adjusted under 35 U.S.C. 154(b) by 365 days.

(21) Appl. No.: 10/669,625

(22) Filed: Sep. 25, 2003

(65) Prior Publication Data

US 2004/0094912 A1 May 20, 2004

(30) Foreign Application Priority Data

Sep. 25, 2002 (JP) .............................. 2002-279860
Oct. 25, 2002 (JP) .............................. 2002-311819

(51) Int. Cl.
*B60G 17/015* (2006.01)

(52) U.S. Cl. ........................... 280/5.518; 701/1; 701/37

(58) Field of Classification Search ............. 280/5.518, 280/5.512, 5.514, 5.517; 701/1, 37; 73/105
See application file for complete search history.

(56) References Cited

U.S. PATENT DOCUMENTS

| | | | | |
|---|---|---|---|---|
| 4,422,322 A | * | 12/1983 | Spangler | 73/105 |
| 4,651,290 A | * | 3/1987 | Masaki et al. | 701/80 |
| 4,741,207 A | * | 5/1988 | Spangler | 73/146 |
| 4,827,416 A | * | 5/1989 | Kawagoe et al. | 701/38 |
| 5,027,302 A | * | 6/1991 | Asanuma et al. | 701/48 |
| 5,347,457 A | * | 9/1994 | Tanaka et al. | 701/37 |
| 5,444,621 A | * | 8/1995 | Matsunaga et al. | 701/37 |
| 5,497,325 A | * | 3/1996 | Mine | 701/38 |
| 6,000,620 A | * | 12/1999 | May | 235/493 |
| 6,157,879 A | * | 12/2000 | Kwack et al. | 701/37 |
| 6,202,020 B1 | * | 3/2001 | Kyrtsos | 701/80 |
| 6,763,292 B1 | * | 7/2004 | Smith et al. | 701/37 |
| 6,801,837 B2 | * | 10/2004 | Carlstedt et al. | 701/1 |
| 2005/0090956 A1 | * | 4/2005 | Ogawa | 701/37 |

FOREIGN PATENT DOCUMENTS

| | | |
|---|---|---|
| JP | 62-289421 | 12/1987 |
| JP | 5-262251 | 10/1993 |
| JP | 5-345509 | 12/1993 |
| JP | 11-115545 | 4/1999 |
| JP | 2000-322695 | 11/2000 |

* cited by examiner

*Primary Examiner*—Paul N. Dickson
*Assistant Examiner*—Toan C. To
(74) *Attorney, Agent, or Firm*—Bacon & Thomas, PLLC

(57) ABSTRACT

The invention provides a suspension control apparatus for a vehicle which can execute a suspension control suitable even for a rough road by executing the suspension control based on an actual road surface profile, while taking various vehicle states (weight, speed, etc.) into consideration, and learning the road surface profile. The suspension control apparatus has a vertical acceleration sensor for detecting a vertical acceleration of the vehicle, and a control unit for determining a road surface profile by estimating waves and irregularities in the road surface based on the vertical acceleration of the vehicle detected by the vertical acceleration sensor, and determining a suspension control value based on the thus determined road surface profile.

16 Claims, 27 Drawing Sheets

|  | ROAD SURFACE VIBRATION FREQUENCY (LARGE 15Hz~) | ROAD SURFACE VIBRATION FREQUENCY (MIDDLE 2~15Hz) | ROAD SURFACE VIBRATION FREQUENCY (SMALL 1~2Hz) |
|---|---|---|---|
| ROAD SURFACE AMPLITUDE (LARGE 9cm~) | 1 (+1) | 2 (+1) | 3 (+1) |
| ROAD SURFACE AMPLITUDE (MIDDLE 5~9cm) | 2 (+1) | 4 (+1) | 6 (+1) |
| ROAD SURFACE AMPLITUDE (SMALL 1~5cm) | 3 (+1) | 6 (+1) | 9 (+1) |

FIG.9

|  | ROAD SURFACE VIBRATION FREQUENCY (LARGE 15Hz~) | ROAD SURFACE VIBRATION FREQUENCY (MIDDLE 2~15Hz) | ROAD SURFACE VIBRATION FREQUENCY (SMALL 1~2Hz) |
|---|---|---|---|
| ROAD SURFACE AMPLITUDE (LARGE 9cm~) | 1 | 2 | 3 |
| ROAD SURFACE AMPLITUDE (MIDDLE 5~9cm) | 2 | 4 | 6 |
| ROAD SURFACE AMPLITUDE (SMALL 1~5cm) | 3 | 6 | 9 |

FIG.10

|  | ROAD SURFACE VIBRATION FREQUENCY (LARGE 15Hz~) | ROAD SURFACE VIBRATION FREQUENCY (MIDDLE 2~15Hz) | ROAD SURFACE VIBRATION FREQUENCY (SMALL 1~2Hz) |
|---|---|---|---|
| ROAD SURFACE AMPLITUDE (LARGE 9cm~) | 1 (−1) | 2 (−1) | 3 (−1) |
| ROAD SURFACE AMPLITUDE (MIDDLE 5~9cm) | 2 (−1) | 4 (−1) | 6 (−1) |
| ROAD SURFACE AMPLITUDE (SMALL 1~5cm) | 3 (−1) | 6 (−1) | 9 (−1) |

| | ROAD SURFACE VIBRATION FREQUENCY (LARGE 15Hz~) | ROAD SURFACE VIBRATION FREQUENCY (MIDDLE 2~15Hz) | ROAD SURFACE VIBRATION FREQUENCY (SMALL 1~2Hz) |
|---|---|---|---|
| ACCELERATION VERTICAL DIRECTION (SMALL 0.05~0.15m/s²) | ROAD SURFACE AMPLITUDE (SMALL) | ROAD SURFACE AMPLITUDE (SMALL) | ROAD SURFACE AMPLITUDE (MIDDLE) |
| ACCELERATION IN VERTICAL DIRECTION (MIDDLE 0.15~0.25m/s²) | ROAD SURFACE AMPLITUDE (SMALL) | ROAD SURFACE AMPLITUDE (MIDDLE) | ROAD SURFACE AMPLITUDE (LARGE) |
| ACCELERATION IN VERTICAL DIRECTION (LARGE 0.25m/s²~) | ROAD SURFACE AMPLITUDE (MIDDLE) | ROAD SURFACE AMPLITUDE (LARGE) | ROAD SURFACE AMPLITUDE (LARGE) |

|  | ROAD SURFACE VIBRATION FREQUENCY (LARGE 15Hz~) | ROAD SURFACE VIBRATION FREQUENCY (MIDDLE 2~15Hz) | ROAD SURFACE VIBRATION FREQUENCY (SMALL 1~2Hz) |
|---|---|---|---|
| ACCELERATION IN VERTICAL DIRECTION (SMALL 0.1~0.2m/s²) | ROAD SURFACE AMPLITUDE (SMALL) | ROAD SURFACE AMPLITUDE (SMALL) | ROAD SURFACE AMPLITUDE (MIDDLE) |
| ACCELERATION IN VERTICAL DIRECTION (MIDDLE 0.2~0.3m/s²) | ROAD SURFACE AMPLITUDE (SMALL) | ROAD SURFACE AMPLITUDE (MIDDLE) | ROAD SURFACE AMPLITUDE (LARGE) |
| ACCELERATION IN VERTICAL DIRECTION (LARGE 0.3m/s²~) | ROAD SURFACE AMPLITUDE (MIDDLE) | ROAD SURFACE AMPLITUDE (LARGE) | ROAD SURFACE AMPLITUDE (LARGE) |

FIG.18

| | ROAD SURFACE VIBRATION FREQUENCY (LARGE 15Hz~) | ROAD SURFACE VIBRATION FREQUENCY (MIDDLE 2~15Hz) | ROAD SURFACE VIBRATION FREQUENCY (SMALL 1~2Hz) |
|---|---|---|---|
| ACCELERATION IN VERTICAL DIRECTION (SMALL 0.15~0.25m/s²) | ROAD SURFACE AMPLITUDE (SMALL) | ROAD SURFACE AMPLITUDE (SMALL) | ROAD SURFACE AMPLITUDE (MIDDLE) |
| ACCELERATION IN VERTICAL DIRECTION (MIDDLE 0.25~0.35m/s²) | ROAD SURFACE AMPLITUDE (SMALL) | ROAD SURFACE AMPLITUDE (MIDDLE) | ROAD SURFACE AMPLITUDE (LARGE) |
| ACCELERATION IN VERTICAL DIRECTION (LARGE 0.35m/s²~) | ROAD SURFACE AMPLITUDE (MIDDLE) | ROAD SURFACE AMPLITUDE (LARGE) | ROAD SURFACE AMPLITUDE (LARGE) |

FIG.19

SUSPENSION CONTROL APPARATUS OF VEHICLE

The disclosures of Japanese Application No. 2002-279860, filed on Sep. 25, 2002 and Japanese Patent Application No. 2002-311819, filed on Oct. 25, 2002 including their specifications, drawings and abstracts are incorporated herein by reference in their entirety.

CROSS-REFERENCE TO RELATED APPLICATIONS

This application claims, under 35 USC 119, priority of Japanese Application No. 2002-279860 filed Sep. 25, 2002 and Japanese Application No. 2002-311819 filed Oct. 25, 2002.

BACKGROUND OF THE INVENTION

The present invention relates to a suspension control apparatus/method for a vehicle.

Vehicles equipped with navigation apparatus have been conventionally provided with a suspension control apparatus which can execute a suspension control corresponding to road condition data received from the navigation apparatus. With such suspension control apparatus, for example, when a curve is detected based on road data such as a profile of the road ahead, an adjustment of the suspension strength is calculated based on the shape of the detected curve, steering and vehicle speed. See, for example, Japanese Patent Publication No. 5-345509.

Further, there has been proposed control of suspension strength based on a data base with data indicating roughness of the road. See, for example, Japanese Patent Publication No. 2000-322695. In this case, learning is executed by acquiring data for vertical acceleration as input from the suspension. Based on the acquired vertical acceleration data roughness of the road is determined and recorded in the data base. In other words, results of actual control of the suspension are compared with an estimated control, and the data base is corrected based on the comparison.

However, the above-mentioned suspension control apparatus, which executes suspension control based on data for the shape of the road received from the navigation apparatus, differentiates only between a paved road and an unpaved road, and the actual road surface profile including its irregularities is not considered. Further, with respect to the vehicle state, only the vehicle speed and the steering are considered. Accordingly, the advance setting of control of the suspension on the rough road may cause the driver to feel a sense of discomfort.

Further, in the case of executing learning, since the learning is not of the road surface profile but, rather, with regard to the location where a swing is felt, the learning sometime disregards vehicle parameters such as the vehicle speed and vehicle weight. In the case that the advance control of the suspension for a rough road is based on learning in the manner mentioned above, the driver feels a sense of discomfort.

SUMMARY OF THE INVENTION

Accordingly, it is an object of the present invention to provide a suspension control apparatus for a vehicle which can solve the above-mentioned problems, and which can suitably execute suspension control even on a rough road by basing the suspension control on an actual road surface profile while taking various vehicle parameters into consideration, and learning the road surface profile.

The suspension control apparatus for a vehicle according to a first aspect of the present invention has a vertical acceleration sensor for detecting vertical acceleration of the vehicle; and a control unit for determining a road surface profile by estimating waves and irregularities in the road surface based on the vertical acceleration of the vehicle detected by the vertical acceleration sensor, and determining a suspension control value based on the determined road surface profile.

Accordingly, it is possible to properly execute suspension control in accordance with an actual road surface profile.

The suspension control apparatus for a vehicle according to a second aspect of the present invention has a vertical acceleration sensor for detecting a vertical acceleration of a vehicle, a vehicle speed sensor for detecting vehicle speeds, a weight sensor for detecting vehicle weight, and a control unit for determining a road surface profile by estimating waves and irregularities of the road surface based on the vertical acceleration of the vehicle detected by the vertical acceleration sensor, the vehicle speed detected by the vehicle speed sensor and the vehicle weight detected by the weight sensor, and determining a suspension control value based on the thus determined road surface profile.

Accordingly, in accordance with the second aspect of the invention also, it is possible to properly execute suspension control based on an actual road surface profile.

BRIEF DESCRIPTION OF THE DRAWINGS

FIG. 9 shows a suspension control map for use where the vehicle weight is high according to the preferred embodiment of the present invention;

FIG. 10 shows a suspension control map for use with a medium vehicle weight according to the preferred embodiment of the present invention;

FIG. 11 shows a suspension control map for use with a low vehicle weight according to the preferred embodiment of the present invention;

FIG. 17 is a learning map for the case of a high vehicle weight according to the preferred embodiment of the present invention;

FIG. 18 shows a learning map for the case of a mid-weight vehicle according to the preferred embodiment of the present invention;

FIG. 19 shows a learning map for the case of a low vehicle weight according to the preferred embodiment of the present invention;

DESCRIPTION OF THE PREFERRED EMBODIMENT

An embodiment in accordance with the present invention will now be described in detail with reference to the accompanying drawings.

Figure 2:
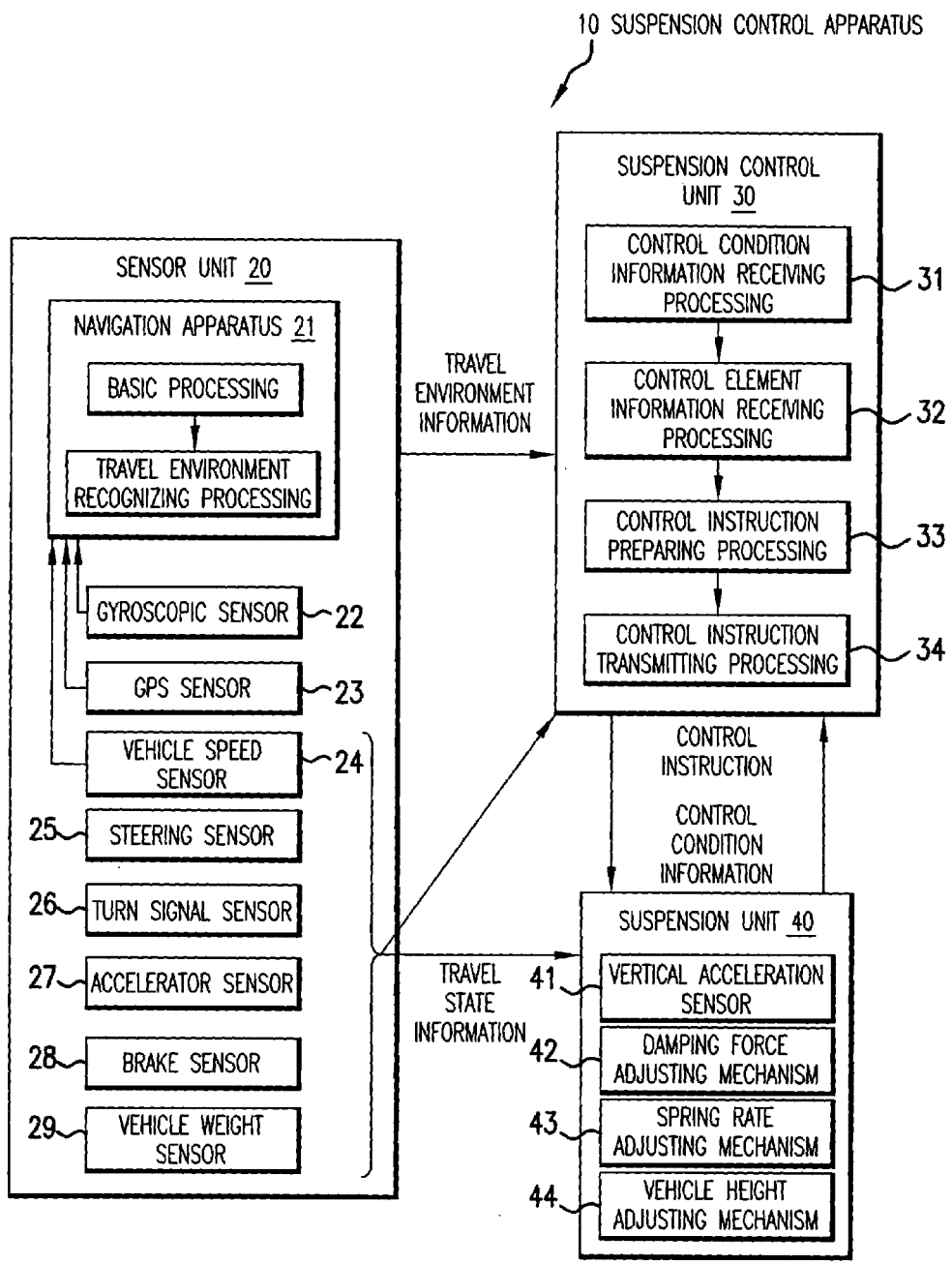
FIG. 2 is a block diagram showing the structure of a suspension control apparatus of a vehicle according to the embodiment of the present invention.
Figure 3:
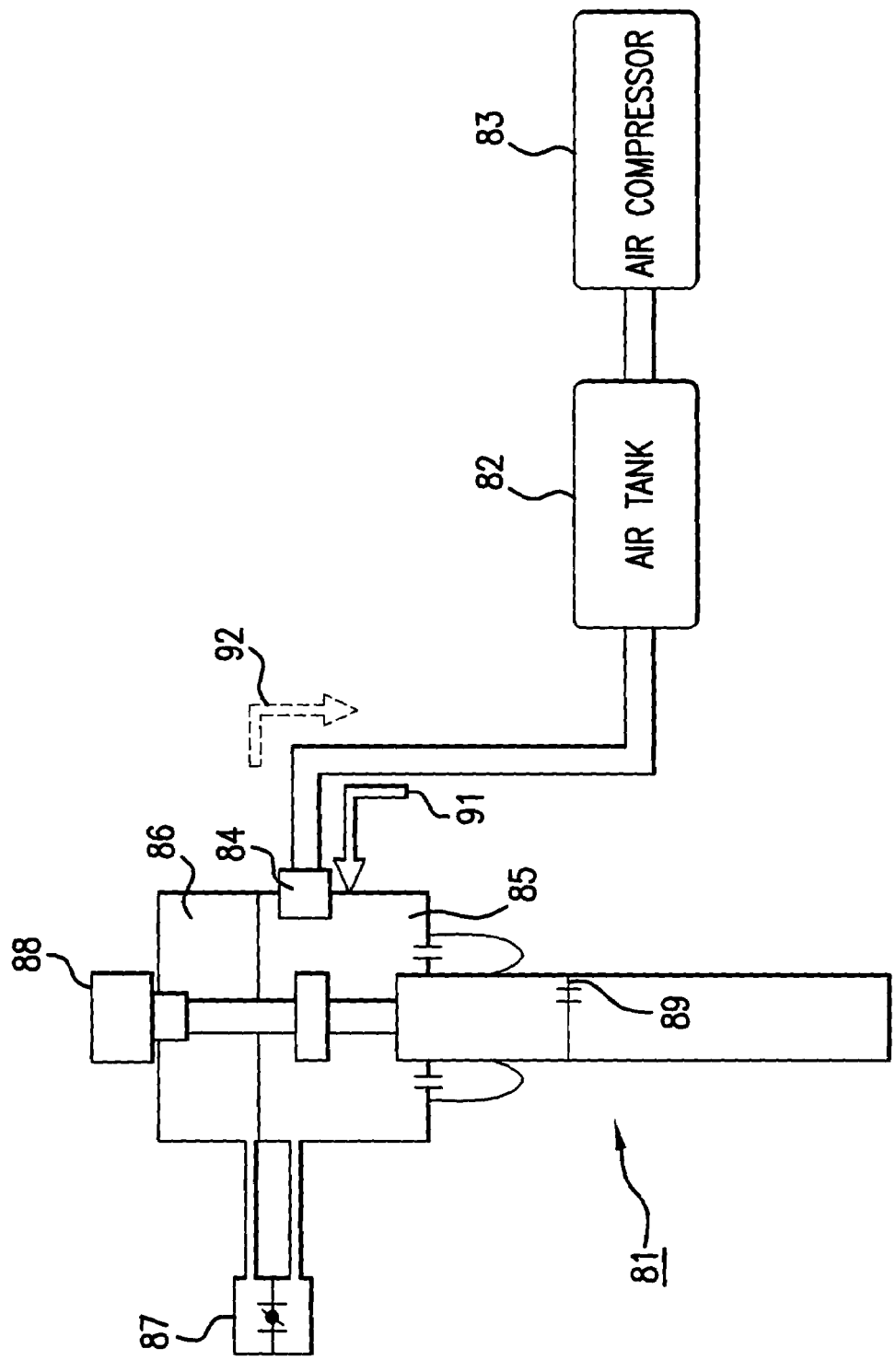
FIG. 3 is a schematic diagram of the structure of a suspension according to the preferred embodiment of the present invention.

As shown in FIGS. 2 and 3 of the drawings, a vehicle suspension control apparatus 10 includes a sensor unit 20 for outputting information for the travel environment of the vehicle corresponding to road information, a suspension control unit 30 for controlling the suspension of the vehicle, and a suspension unit 40 controlled by control unit 30. The vehicle may be any kind of vehicle which can travel on a road, such as a passenger car, a truck, a bus or a two-wheeled vehicle. In the present embodiment, for convenience of explanation, a four-wheel passenger car having a suspension unit 40 mounted on each of the four wheels will be described.

A navigation apparatus 21 is shown as receiving signals from a gyroscopic sensor 22 for detecting rotation angular velocity, that is, a turning angle of the vehicle, a global positioning system (GPS) sensor 23, and a vehicle speed sensor 24 for detecting speed of the vehicle. The suspension controller 30 receives the signals from the vehicle speed sensor 24, as well as from a steering sensor 25 for detecting the steering angle of the steering wheel of the vehicle operated by the driver, a turn signal sensor 26 for detecting operation of a turn signal (direction indicator of the vehicle), an accelerator sensor 27 for detecting degree of opening of an accelerator operated by the driver, a brake sensor 28 for detecting motion of a brake pedal of the vehicle operated by the driver, and a weight sensor 29 for detecting weight of the vehicle.

The navigation apparatus 21 is provided with computing means such as a CPU, an MPU, memory means such as a semiconductor memory and/or a magnetic disc, input means such as a touch panel, a remote controller and/or push buttons and a communication interface. In addition to connection to the gyroscopic sensor 22, the GPS sensor 23 and the vehicle speed sensor 24, the navigation apparatus 21 may receive signals from a geomagnetic sensor, a distance sensor, a beacon sensor and an altimeter which are not illustrated. Further, the navigation apparatus 21 detects current position of the vehicle, direction of the vehicle, speed of the vehicle and distance traveled by the vehicle based on signals from the gyroscopic sensor 22, the GPS sensor 23, the vehicle speed sensor 24, the geomagnetic sensor, the distance sensor, the beacon sensor and the altimeter. In this preferred embodiment, the navigation apparatus 21 executes basic processing and travel environment recognition processing, and transmits travel environment information to the suspension control unit 30.

The GPS sensor 23 detects the current position on the basis of radio transmissions from a GPS satellite (not shown), the geomagnetic sensor detects the direction of the vehicle by the earth's magnetism, and the distance sensor detects a distance between predetermined positions on the road. The distance sensor may be a device for measuring number of rotations of the wheels (not shown) or a device which measures acceleration and integrates the acceleration twice so as to obtain the distance. Further, the beacon sensor receives position information from beacons arranged along the road to detect the current position.

In this case, the vehicle weight sensor 29 is connected to an in-vehicle LAN (local area network) arranged within the vehicle, acquires a vehicle code corresponding to information communicated via the in-vehicle LAN, specifies type of vehicle based on the vehicle code, and acquires the basic weight of the vehicle. Further, the vehicle weight sensor 29 includes a seat sensor in each of the seats, and calculates a deadweight based on the number of passengers sitting on the seats. Further, a vehicle weight corresponding to the total weight of the vehicle is detected by summing the basic weight of the vehicle and the deadweight. Alternatively, the deadweight can be determined from an auto leveling device when the vehicle is stopped.

The memory means of the navigation apparatus 21 is provided with a database including a facility information data file containing a map data file, a crossing point data file, a node data file, a road data file and information for facilities such as hotels, gasoline stations, shops and stations in various regions. Further, the memory means contains data for displaying a guide map along a search route on a screen of the display means, displaying a distance to the next crossing point, displaying direction of travel at the next crossing point, and displaying other guide information, in addition to data for searching to determine an optimum route or "search route." Also data for audio output of predetermined information is recorded in the memory means. Further, the memory means includes various recording mediums such as a magnetic tape, a magnetic disc, a magnetic drum, a flash memory, a CD-ROM, an MD, a DVD-ROM, an optical disc, an MO, an IC card, an optical card and/or a memory card, and can also employ a detachable external memory medium.

The road is displayed on the screen of the display unit based on the crossing point data, the node data and the road data. The crossing point data indicates whether the crossing point does or does not have a traffic signal light. The node data includes position and shape of the road as map data recorded in the map data file, i.e., data showing branch points (including crossing points and T-junctions) of an actual road, node points and links connecting the node points. Further, the node points show position of any bend in the road.

The road data includes data such as a width of road, inclination of the road, a cant of the road, height, banking of the road, state of the road surface, number of traffic lanes, locations where the number of traffic lanes is reduced and location where the width is narrowed. In the case of a highway or other main road, each of opposing lanes is stored as a separate road, and the road is treated as a double road. For example, in the case of the main road having two lanes or more, the road is treated as a double road, and traffic lane in one direction and a lane in the opposite direction are each stored as an independent road in the road data. Further, data for corners includes data for radius of curvature, crossing points, T-junctions, starting points of turns around the corners. Road attribute data includes data for railroad crossings, a highway entrance and exit ramps, toll gates, descending slopes, ascending slopes, and type of road (a Federal interstate highway, a state road, or freeway).

The communication interface of the navigation apparatus 21 serves as the communication means for the suspension control apparatus 10, i.e., for communication between the suspension control unit 30 and an FM transmitting device, a telephone network, the internet and/or a cellular phone network. The communication interface receives various types of data, for example, road information such as traffic jams, traffic accidents and D-GPS information indicating a detection error of the GPS sensor 23.

The navigation apparatus 21 executes basic processes such as searching for a route to a destination ("search route"), travel guidance along the search route, searching for a location or facility, displaying a map on the screen of the display means, and displays the current position of the vehicle, the search route from the current position to the destination, and the guidance information for travel along the search route. The guidance information may be audio output by sound producing means. The navigation apparatus 21 also functions as current position tracking means for showing the current position of the vehicle. Further, the navigation apparatus 21 executes travel environment recognition for recognizing shape of a corner, a crossing point, or T-junction, entrance and exit ramps positioned in advance of the vehicle in the direction of travel, and a recommended speed for approach to a corner. The travel environment information is transmitted to the suspension control unit 30.

Further, the suspension control unit 30 is provided with computing means such as a CPU and/or MPU, memory means such as a semiconductor memory and/or a magnetic disc and the communication interface. As previously noted, the suspension control unit 30 is connected to the vehicle speed sensor 24, the steering sensor 25, the turn signal sensor 26, the accelerator sensor 27, the brake sensor 28 and the vehicle weight sensor 29, from which it receives the vehicle travel state information. Further, the suspension control unit 30 executes various routines such as for receiving control condition information, for receiving control element information, control instruction preparation and control instruction transmission, and transmits the control instructions to the suspension unit 40.

The suspension unit 40 includes a vertical acceleration sensor 41, a damping force adjusting mechanism 42, a spring rate adjusting mechanism 43 and a vehicle height adjusting mechanism 44, in addition to a spring, a damper (an attenuation device) and a wheel guide mechanism (a link) provided in a conventional suspension. The vertical acceleration sensor 41 detects a vertical acceleration of the vehicle corresponding to vertical acceleration of an upper portion of a spring corresponding to vertical movement of a vehicle body side portion in the suspension unit 40. The damping force adjusting mechanism 42 serves to adjust the damping force of the damper. For example, where the damper is a hydraulic damper, the damping force can be adjusted by adjusting the orifice diameter of an oil flow passage. Further, the spring rate adjusting mechanism 43 changes the value of the spring rate (a spring constant or a spring rate) of the spring by adjusting rigidity of the spring, that is, hardness of the spring. The vehicle height adjusting mechanism 44 adjusts height of the vehicle body. The suspension unit 40 also transmits the actual values for the controlled parameters to the suspension control unit 30.

While in the embodiment shown in FIG. 2, the suspension control unit 30 is independently structured, the function of the suspension control unit 30 may be incorporated into the sensor unit 20 or the suspension unit 40.

A method for adjusting the damping force, the spring rate and the vehicle height will now be described for the case in which the suspension unit 40 is an air suspension employing an air spring. An air suspension unit 81 corresponding to the suspension unit 40 has the structure shown in FIG. 3. First, to adjust the damping force, the damping force adjusting mechanism 42 activates a damping force adjusting actuator 88. Accordingly, an orifice switching type damping variable valve 89 is rotated, thereby changing the diameter of the orifice of the damper so as to adjust the damping force.

Further, to adjust the spring rate, the spring rate adjusting mechanism 43 activates an opening and closing valve 87. Accordingly, the spring rate adjusting mechanism 43 adjusts the spring rate by opening or closing a passage between a main air chamber 85 and a sub air chamber 86, or changing the amount of throttle of the passage. In other words, since the spring rate is lowered in proportion to a volumetric capacity of the air chamber in the air suspension, only the main air chamber 85 is used to provide a high spring rate, and the passage is opened and the sub air chamber 86 is also used to provide a low spring rate.

For adjusting the vehicle height, the vehicle height adjusting mechanism 44 activates a solenoid valve 84. Accordingly, air pressure within the main air chamber 85 and the vehicle height are adjusted by supplying air into the main air chamber 85 from an air tank 82 as shown by an arrow 91, or discharging air from the main air chamber 85 as shown by an arrow 92. Air is supplied to the air tank 82 from an air compressor 83, as necessary.

Operation of the suspension control apparatus 10 of the vehicle having the above-described structure will now be described for a suspension control responsive to road surface conditions, with reference to FIGS. 1, 4, 5 and 6.

Rough roads generally include unpaved roads and gravel roads, but a wavy road surface in a highway is also included. Further, various road surface profiles exist in these roads. However, since the conventional control only classifies the various road surface profiles as either paved road or unpaved road, with the conventional control it is impossible to provide advance control of the suspension corresponding to the actual road surface.

Accordingly, the suspension control apparatus 10 of the present invention determines the road surface profile by estimating waves and irregularities in the road surface based on the acceleration of the vehicle 11 in the vertical direction, and determines a suspension control value based on the thus determined road surface profile. In other words, a suspension control with a higher precision is executed by dividing the road surface profile into elements having an amplitude (roll of the road surface) and a wavelength (width between the rolls) so as to reflect the actual road surface profile used in control, not in accordance with mere classification as unpaved road or gravel road.

Figure 1:
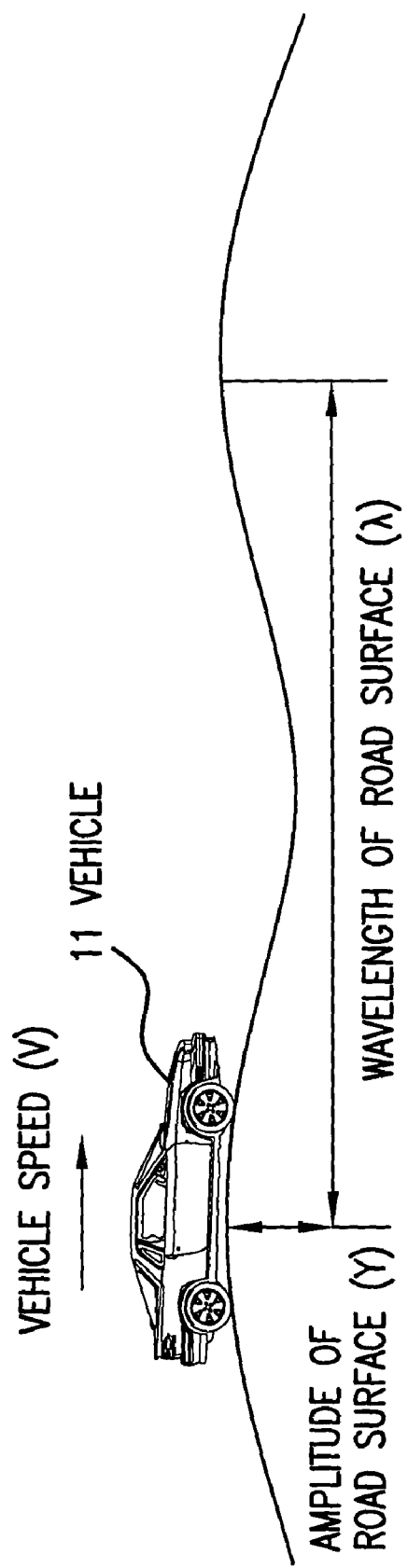
FIG. 1 is a representation of frequency of vibration from a road surface according to a preferred embodiment of the present invention.

First, the suspension control apparatus 10 of the vehicle adjusts the suspension control value in accordance with the vibration frequency. As shown in FIG. 1, on the assumption that the surface of the road on which the vehicle 111 travels has a wave profile of an amplitude Y and a wavelength λ, a vibration frequency N of the vibration applied to the vehicle 11 from the road surface is determined in accordance with the following formula (1), based on speed V of the vehicle 11 and the wavelength λ of the road surface.

$$N=V/\lambda \quad (1)$$

where the vibration frequency N is close to a specific frequency of the spring in the suspension, resonance of the spring is generated at the vibration frequency N, amplitude of stroke of the suspension is increased, and a butterfly motion is sensed by the passenger. Accordingly, in this case, the damping force of the damper is made larger or the spring rate is adjusted to be made larger. In other words, it is possible to restrict the vibration applied to the vehicle 11 by adjusting the suspension so as to become hard.

Further, the suspension control apparatus 10 of the vehicle adjusts the suspension control value in accordance with the amplitude. In general, the larger the road surface amplitude Y, the greater the vibration of the vehicle 11. Therefore, in the case of a large road surface amplitude Y, the damping force of the damper or the spring rate is adjusted so as to be made smaller. In other words, it is possible to restrict the vibration of the vehicle 11 by adjusting the suspension so as to become soft.

Figure 4:
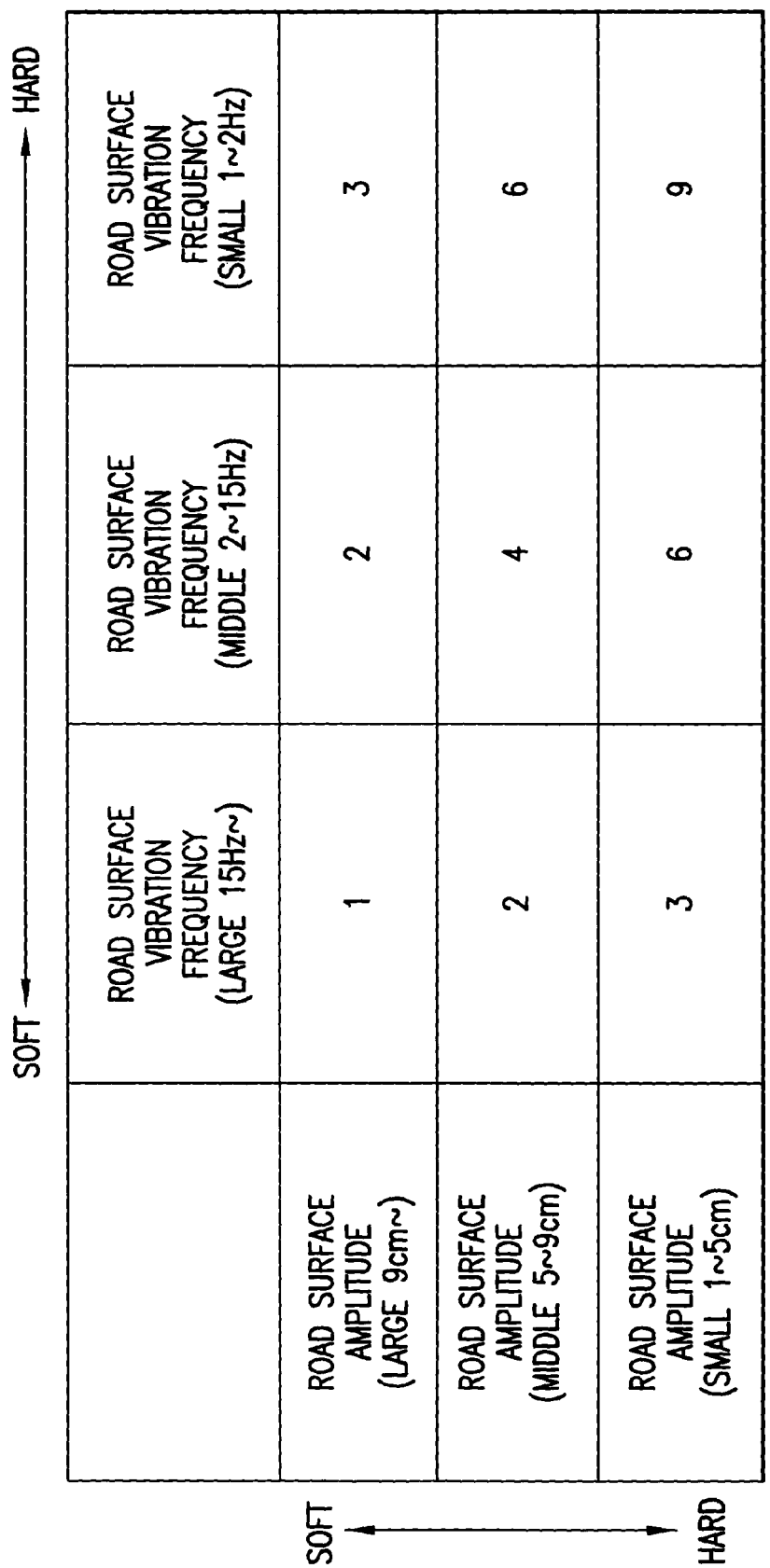
FIG. 4 shows a suspension control map suitable for use in the preferred embodiment of the present invention.

The suspension control unit 30 has a suspension control map as shown in FIG. 4 stored in the memory means, and prepares a control instruction including a suspension control value in accordance with the suspension control map and transmits the control instruction to the suspension unit 40. In accordance with the suspension control map, the suspension is adjusted to be harder as the road surface amplitude Y becomes smaller, and the suspension is adjusted so as to be made harder as frequency of the vibration imparted to the vehicle 11 from the road surface, that is the road surface vibration frequency N, becomes smaller. Numeric values 1 to 9 shown in the suspension control map of FIG. 4 are hardness values set corresponding to suspension control values. The hardness value is a numeric value indicating a degree of hardness of the suspension, and a large hardness value means that the suspension should be made hard. In this case, the numeric values of the road surface amplitude Y and the road surface vibration frequency N shown in the suspension control map are only one example, and can be suitably set to other values. Further, the road surface amplitude Y and the road surface vibration frequency N are each classified into three stages, but may be classified into two stages, or four or more stages. Further, the hardness value may be classified into eight or less stages, or ten or more stages.

Figure 5:
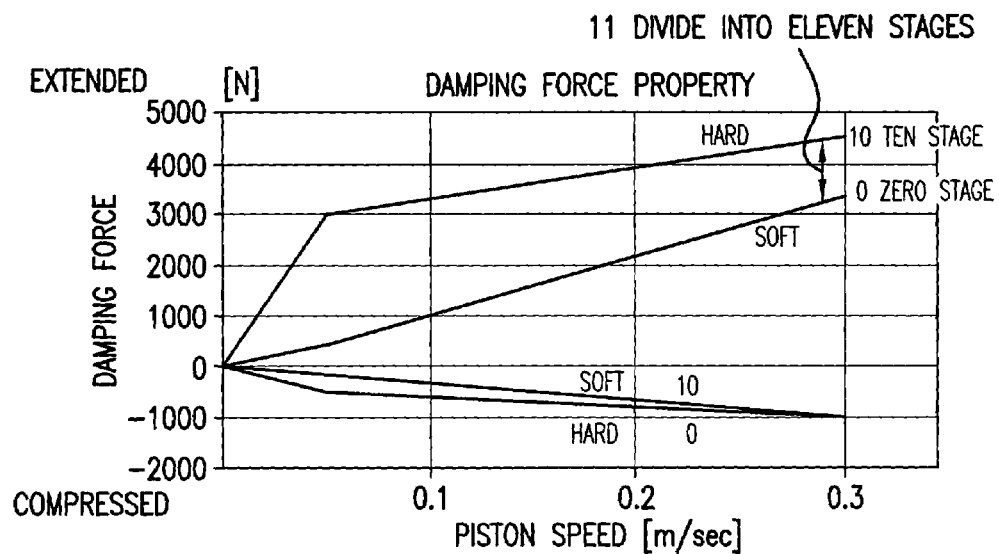
FIG. 5 shows a damping force map suitable for use in the preferred embodiment of the present invention.

Further, the damping force of the damper corresponding to the hardness value is, for example, set in accordance with a damping force property map as shown in FIG. 5, and is stored in the memory means of the suspension control unit 30. The vertical axis (abscissa) in FIG. 5 indicates the damping force of the damper, and the horizontal axis (ordinate) indicates piston speed of the damper. In this case, numeric values of the damping force and the piston speed shown in FIG. 5 correspond to one example for application to a general use hydraulic damper for passenger cars, and are changed in accordance with the type of the vehicle and/or the type of damper. Further, the example shown in FIG. 5 is for hardness set values classified into eleven stages. The damping force of the damper is classified into eleven stages from No. 0 to No. 10 stages. A bold line represents a property curve for the case where the damping force is the largest, that is, the suspension is the hardest, and a fine line represents a property curve for the case where the damping force is the smallest, that is, the suspension is the softest. Property curves corresponding to the intermediate stages 1 to 9 are omitted. Further, a positive value on the property curve indicates that the axial dimension of the damper is extended, and a negative value on the property curve indicates that the axial dimension of the damper is compressed.

Accordingly, in controlling the damping force of the damper to adjust the hardness of the suspension, the suspension control unit 30 determines the hardness value corresponding to the suspension control value in accordance with the suspension control map, selects the property curve corresponding to the hardness value in accordance with the damping force property map, and transmits the property curve to the suspension unit 40. Thus, the damping force adjusting mechanism 42 of the suspension unit 40 controls the damping force of the damper so as to achieve the damping force in accordance with the transmitted property curve.

Figure 6:
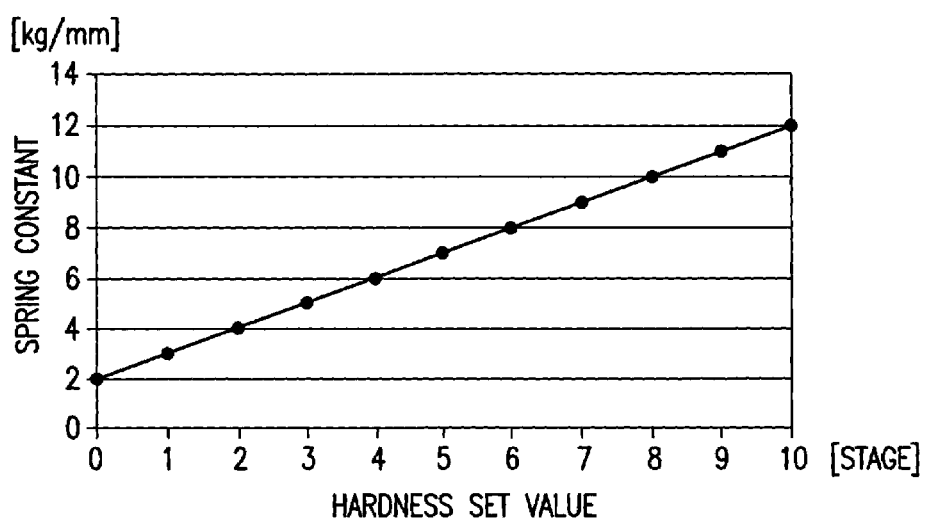
FIG. 6 shows a spring rate map suitable for use in the illustrated preferred embodiment of the present invention.

Further, the spring rate corresponding to the hardness value is set, for example, in accordance with a spring rate property map as shown in FIG. 6, and is stored in the memory means of the suspension control unit 30. The vertical axis (abscissa) in FIG. 6 indicates a spring constant corresponding to the spring rate, and the horizontal axis (ordinate) indicates a hardness value. The numeric values of the spring rate shown in FIG. 6 represent an example applied to a general use coil spring in a passenger car, and are changed in accordance with the type of the vehicle and/or the type of the spring. Further, the example shown in FIG. 6 corresponds to a case wherein the hardness values are classified into eleven stages.

Accordingly, in the case of controlling the spring rate so as to adjust the hardness of the suspension, the suspension control unit 30 determines the hardness value corresponding to the suspension control value in accordance with the suspension control map, selects the spring rate corresponding to the hardness value in accordance with the spring rate property map, and transmits the spring rate to the suspension unit 40. Thus, the spring rate adjusting mechanism 43 of the suspension unit 40 adjusts the actual spring rate of the spring to the transmitted value for spring rate.

Next, a suspension control in accordance with vehicle weight information will be described with reference to FIGS. 7–11.

In general, when the vehicle weight is changed, even on the same road surface, between a spring upper weight limit and a spring lower weight, so that the magnitude of swing in the vehicle body is changed. In contrast, in conventional systems, since change in the vehicle weight is not taken into consideration, control of the suspension can not correspond to the actual vehicle state.

Accordingly, the vehicle suspension control apparatus 10 in accordance with the present embodiment provides control dependent upon the vehicle weight.

Figure 7:
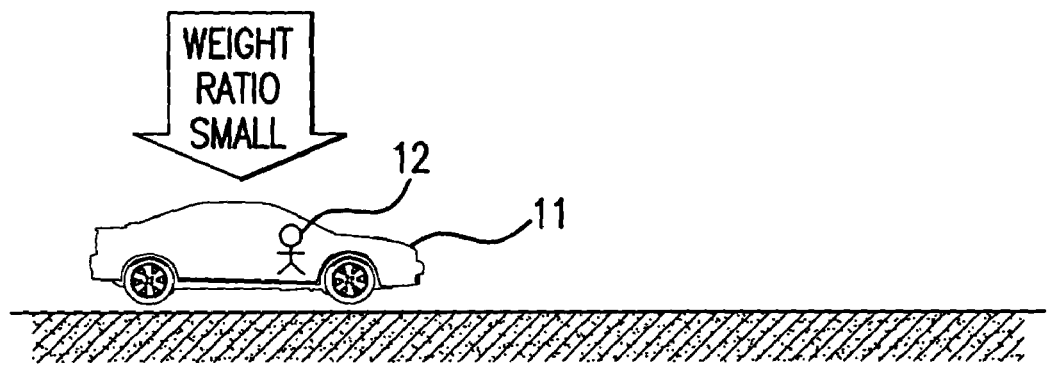
FIG. 7 is a view illustrating a low vehicle weight.
Figure 8:
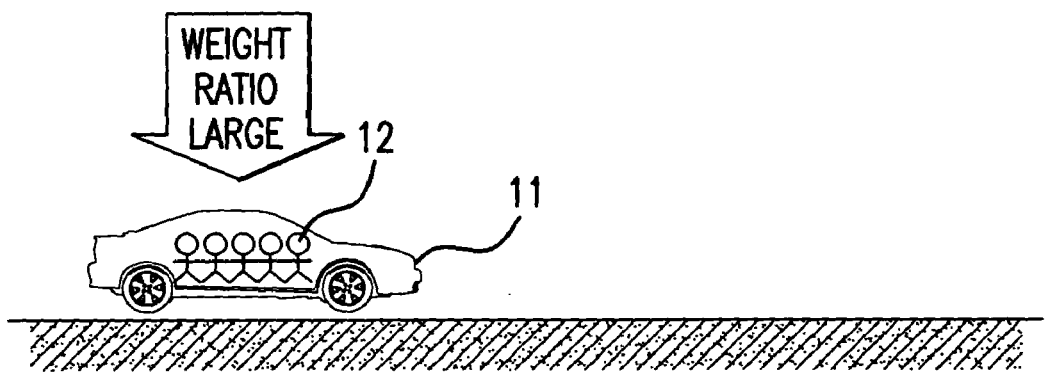
FIG. 8 is a view illustrating a high vehicle weight.

First, the suspension control apparatus 10 of the vehicle adjusts the suspension control value in accordance with the vehicle weight. As shown in FIG. 7, in the case where the number of passengers 12 is small (one in the drawing) and the vehicle weight is low, the swing of the vehicle body is large. Accordingly, the suspension control apparatus 10 adjusts the suspension so as to be soft. Further, as shown in FIG. 8, in the case where the number of the passengers 12 is large (six in the drawing) and the vehicle weight is high, the swing of the vehicle body is small. Accordingly, the suspension control apparatus 10 adjusts the suspension so as to be hard.

The suspension control unit 30 receives the vehicle weight as traveling state information from the vehicle weight sensor 29. In the case where the suspension control unit 30 determines that the vehicle weight is high, it prepares a control instruction in accordance with a suspension control map shown in FIG. 9 and transmits that control instruction to the suspension unit 40. Further, in the case where the suspension control unit 30 determines that the vehicle weight is medium, it prepares a control instruction in accordance with a suspension control map shown in FIG. 10 and transmits that control instruction to the suspension unit 40. Further, in the case where the suspension control unit 30 determines that the vehicle weight is low, it prepares a control instruction in accordance with a suspension control map shown in FIG. 11 and transmits that control instruction to the suspension unit 40. The high, medium and low ranges for the vehicle weight are changed to correspond to the type of vehicle 11.

The suspension control maps shown in FIGS. 9 to 11 are basically the same as the suspension control map shown in FIG. 4, and are obtained by adjusting the hardness values shown in the suspension control map of FIG. 4 in accordance with vehicle weight. For example, the suspension control map shown in FIG. 9 is obtained by adding one to the hardness value shown in the suspension control map of FIG. 4, as indicated by +1 in parentheses. Further, the suspension control map shown in FIG. 11 is obtained by subtracting one from the hardness value shown in the suspension control map of FIG. 4, as indicated by −1 in parentheses. Further, the suspension control map shown in FIG. 10 uses the hardness values of the suspension control map of FIG. 4, as is. Accordingly, the suspension control unit 30 can adjust and use the hardness values of the suspension control map shown in FIG. 4 corresponding to the vehicle weight without storing the suspension control maps shown FIGS. 9 to 11 in the memory means, thus saving memory space in the memory means.

The suspension control unit 30 prepares the control instructions in accordance with the suspension control maps shown in FIGS. 9 to 11 and transmits those control instructions to the suspension unit 40, in the same manner as in the case of the suspension control based on the road surface state described above.

Figure 12:
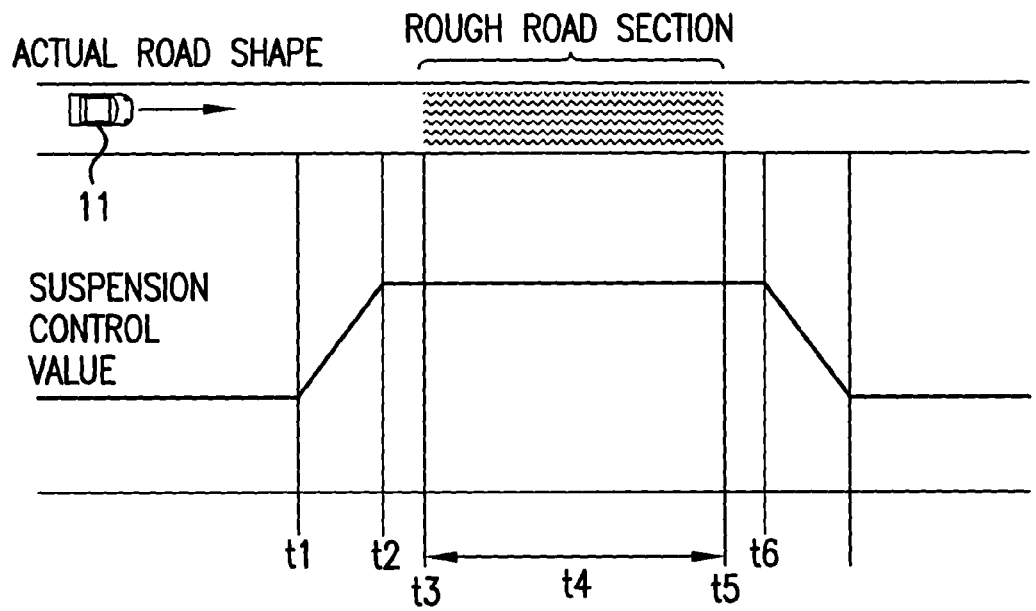
FIG. 12 illustrates changes in a suspension control value in accordance with encounter of a rough road stretch according to the preferred embodiment of the present invention.

Next, timing for executing control will be described for the case of a rough road with reference to FIG. 12.

First, the suspension control before the vehicle 11 has entered the rough road section, which corresponds to an advance control of the suspension, will be described. In the case that the navigation apparatus 21 detects the rough road section within a section 100 m ahead of the vehicle 11, the suspension control unit 30 calculates an optimum suspension control value with respect to the corresponding rough road section at a time t1, changes the suspension control value from the current control value to the optimum control value stepwise, and finishes transition to the optimum control value by a point 30 m short of the rough road section at a time t2. In this case, the suspension control value is a numeric value such as the property curve, the spring rate corresponding to the hardness value included in the control instruction as mentioned above. This makes it possible to enter the rough road without discomfort and without any adverse affect due to an error in the current position detected by the navigation apparatus 21, due to an error in a registered section of the road surface profile and/or due to a time lag in changing the suspension control value, by executing the suspension control in advance, as described above. The rough road section is previously registered as a registered section corresponding to a specified road surface profile (in this case, a "rough road").

Suspension control as the vehicle 11 travels on the rough road section, which corresponds to the advance control of the suspension, will now be described. In this case, the suspension control unit 30 has entered the rough road section at a time t3 while keeping the optimum control value, and basically holds the optimum control value calculated before entry onto the rough road section at a time t4. In the case that the suspension unit 40 has the capability to recognize the current road surface profile and the vibration state from various sensors, and can automatically change the suspension control value, such as an active suspension system, control of the system is given priority.

Now suspension control when the vehicle 11 has departed from the rough road section, which corresponds to the advance control of the suspension, will be described. In this case, the suspension control unit 30 holds the optimum control value for a distance 30 m after the end of the rough road section at a time t5, in order to allow for any error in the registered section of the road surface profile. In the case that a corner or crossing point, or another rough road section is present in advance of the vehicle, the advance control is given priority and the routine for holding the suspension control value is not executed. Further, the suspension control unit 30 returns the suspension control value stepwise when vertical acceleration equal to or greater than a fixed value is not continuously detected for 30 m or more, after leaving the rough road section at time t6.

The case of a continuous rough road will now be described with reference to FIGS. 13 and 14.

Figure 13:
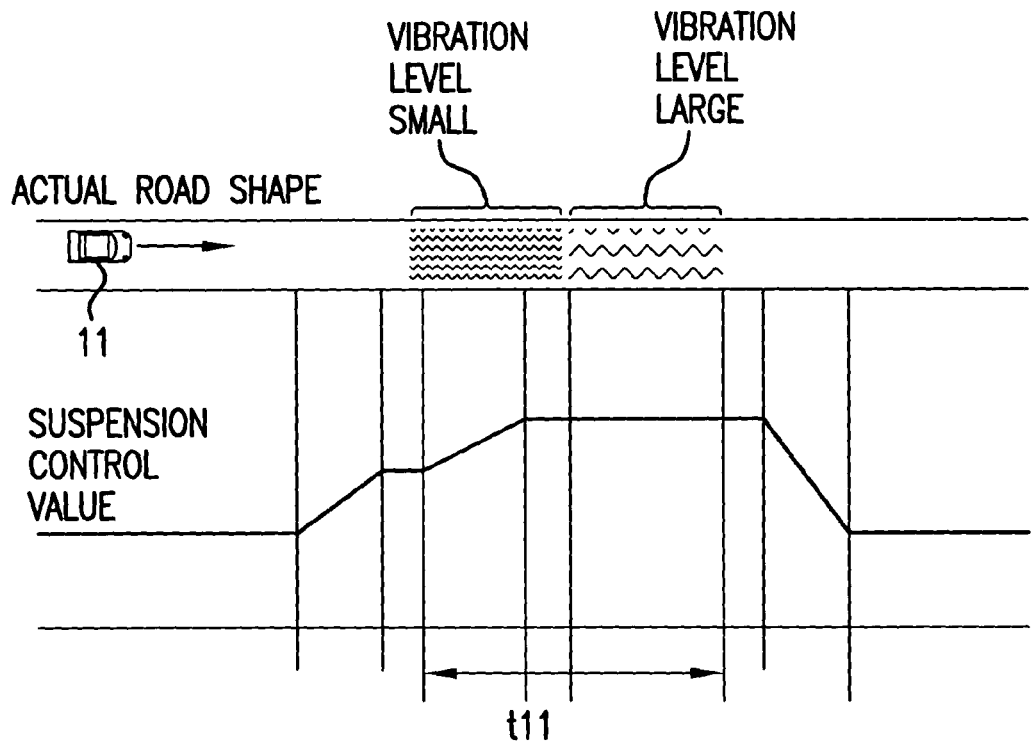
FIG. 13 illustrates changes in the suspension control value on a section of road of varying roughness according to the preferred embodiment of the present invention.

FIG. 13 shows suspension control for the case where the vibration level increases during travel on a rough road section, which corresponds to the advance control of the suspension. In this case, the control value is switched to an optimum control value for a rough road having a large vibration level before the vibration level increases. Accordingly, it is possible to travel without sense of discomfort, i.e., without any control delay resulting in a larger than expected shock. In this case, in a period shown by time t11, the optimum control value with respect to the rough road having the large vibration level is calculated before reaching a point where the vibration level actually increases, and the control value of the suspension is changed.

Figure 14:
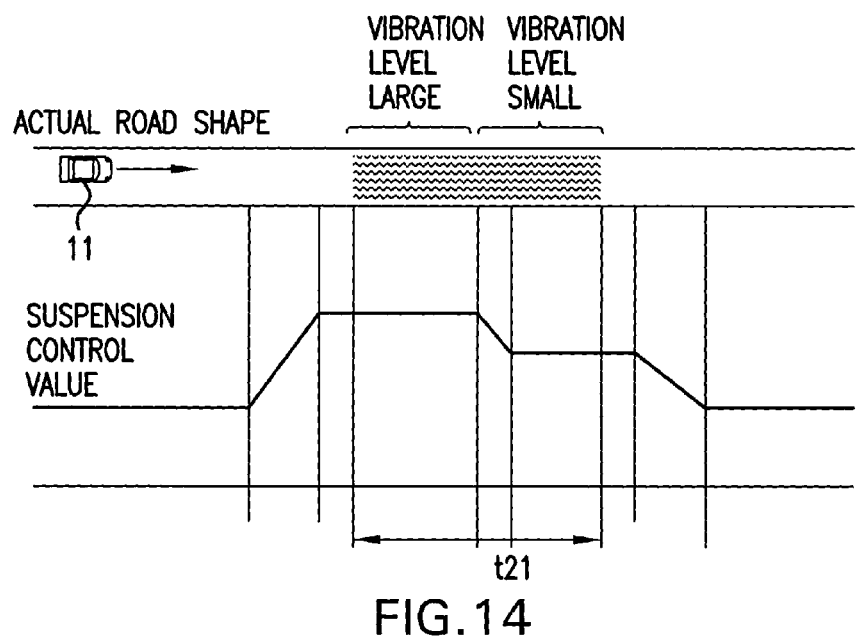
FIG. 14 illustrates changes in the suspension control value on another section of "rough road", of varying roughness, according to the preferred embodiment of the present invention.

FIG. 14 shows the case where the vibration level decreases to small value during travel on the rough road section, which corresponds to the advance control of the suspension. In this case, the suspension control apparatus switches the control value to the optimum control value for a rough road having a small level of vibration stepwise after the vibration level actually decreases, that is, the advance control is not executed. This is because it is impossible to absorb the vibration of the road surface on which the vehicle 11 is traveling currently if the advance control for the lower shock is executed, whereby the vibration is increased and a sense of discomfort is sensed by the passenger. In this case, in a period shown as time t21, the optimum control value is calculated stepwise after reaching the switching point, and the suspension control value is changed.

Next, learning of the road surface condition will be described with reference to FIGS. 15–19.

The suspension control apparatus 10 preferably has a capability for learning the road surface profile, in order to execute the advance control with higher precision. In conventional learning of the road surface profile, since the learning is based on the swing (vertical acceleration) of the vehicle body in actual travel and swing of the vehicle body occurs in the case that the vehicle speed is high and the vehicle weight is low, even in travel of a road section which is not registered as a rough road because of little irregularity in its surface, such a road section will be registered as a rough road section. Thus, in such a case, learning is imprecise and control is sometimes improperly executed under certain vehicle conditions.

Figure 15:
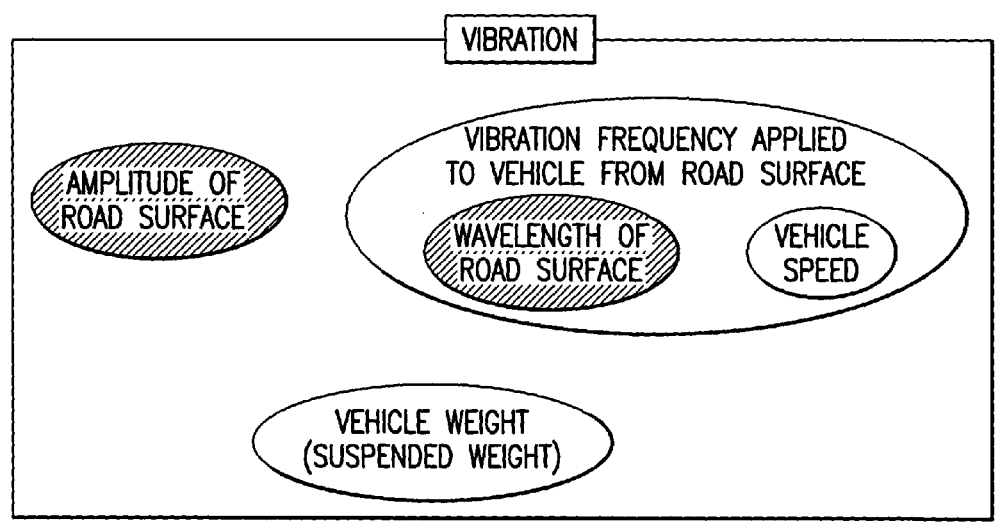
FIG. 15 illustrates learning of a road surface profile according to the preferred embodiment of the present invention.

Accordingly, in the learning of the road surface profile in accordance with the present embodiment, as shown in FIG. 15, the road surface amplitude and the road surface wavelength are both used to express the road surface profile, with simultaneous determination of other factors such as the vehicle speed and the vehicle weight which affect swing of the vehicle body in actual travel, and such other factors are stored along with the road surface wave amplitude and wavelength. In this case, since the road surface profile (the road surface amplitude and the road surface wavelength) is stored instead of storing the detected swing of the vehicle body of an assumed fixed weight in the conventional manner, it is possible to execute advance control of the suspension with high precision by considering the vehicle state, e.g., weight and speed, when the same road section is again traveled.

Figure 16:
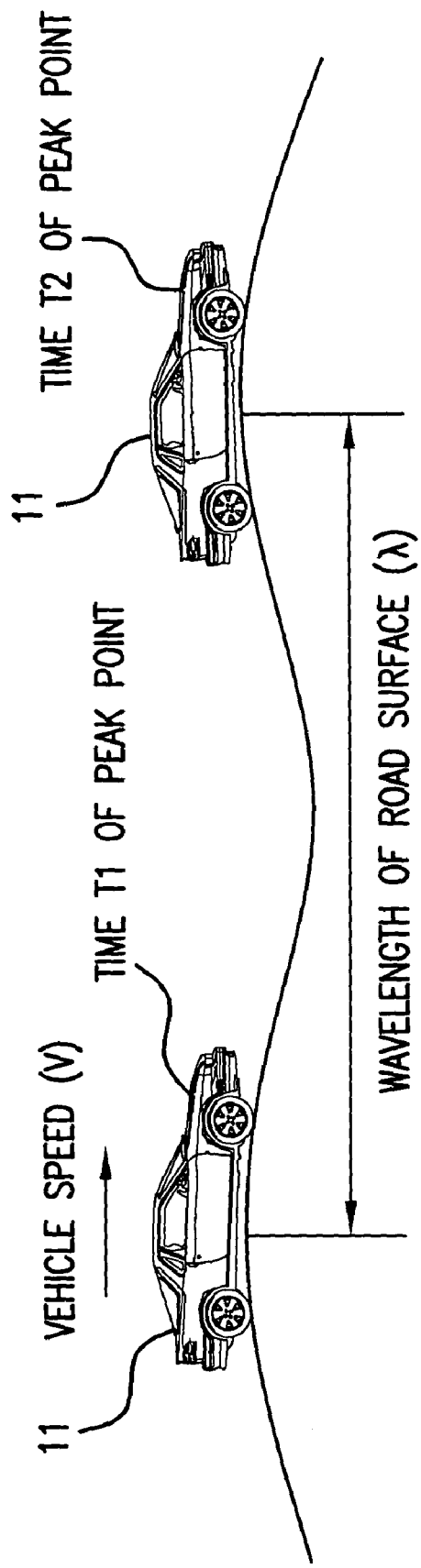
FIG. 16 illustrates road surface "wave length", a parameter used in learning the road surface profile according to the preferred embodiment of the present invention.

Next, the procedure of the learning of the road surface profile will be described. In the learning of the road surface wavelength, the suspension control unit 30 determines a wavelength λ of the road surface for a rough road section based on the interval between times T1 and T2 for peak points in the vertical position of the vehicle body in actual travel, that is, points where motion of the vehicle body in the vertical direction changes between ascending and descending, and further based on vehicle speed V at these peak points, as shown in FIG. 16. The suspension control unit 30 can determine the point in time when the vertical motion of the vehicle changes from the ascending to the descending, based on the acceleration of the vehicle body in the vertical direction received from the vertical acceleration sensor 41 included in the control condition information received from the suspension unit 40.

The time interval between the peak points and the wavelength λ of the road surface can be determined in accordance with the following formulas (2) and (3).

$$\text{Time interval of peak points} = T2-T1 \qquad (2)$$

$$\text{Wavelength λ of road surface} = \text{time interval of peak points} \times \text{vehicle speed} = (T2-T1) \times V \qquad (3)$$

In learning the wave amplitude of the road surface, the suspension control unit 30 prepares the learning maps as shown in FIGS. 17 to 19 for the road surface vibration frequency N determined in accordance with the formula (1), based on the vertical acceleration of the vehicle body received from the vertical acceleration sensor 41, the vehicle weight received from the vehicle weight sensor 29, and the wavelength λ of the road surface and the vehicle speed V, obtained as the vehicle 11 actually travels the road, and determines the road surface amplitude. The suspension control unit 30 prepares, based on the vehicle weight received from the vehicle weight sensor 29, the learning map as shown in FIG. 17 in the case that the vehicle weight is high, the learning map as shown in FIG. 18 in the case that the vehicle weight is mid-range, and the learning map as shown in FIG. 19 in the case that the vehicle weight is low. The numeric values of the vertical acceleration and the road surface vibration frequency N shown in the learning maps are shown only by way of example. Further, while both the vertical acceleration and the road surface vibration frequency N are shown classified into three stages, both may be classified into two stages, four stages or more. It is desirable that the road surface amplitude (small or low), the road surface amplitude (mid-range) and the road surface amplitude (large or high) in the learning maps shown in FIGS. 17 to 19 coincide with the respective road surface amplitudes Y in the suspension control maps shown in FIGS. 4 and 9 to 11, however, it is not necessary that they always coincide.

Figure 20:
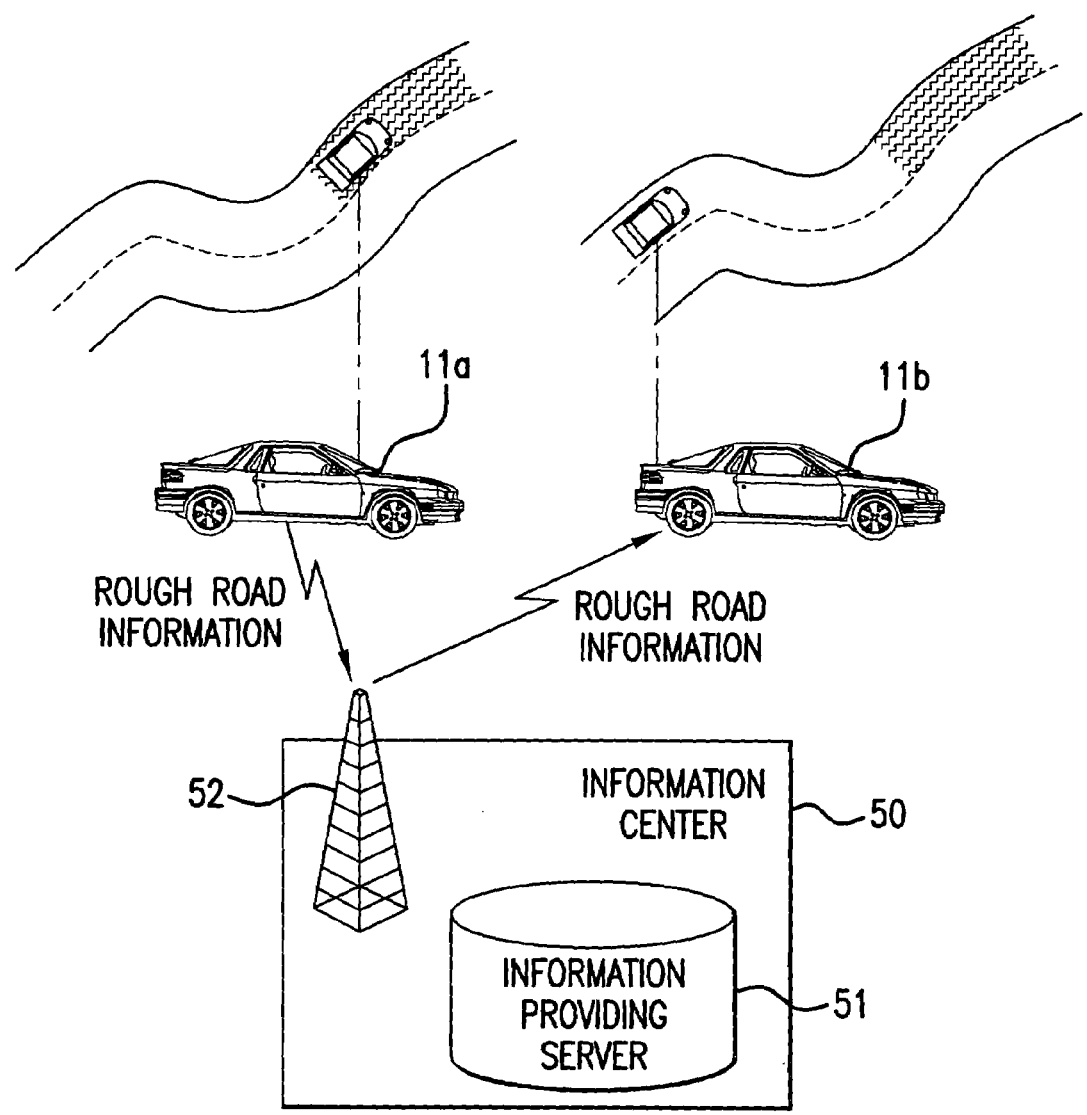
FIG. 20 illustrates a system for sharing road surface profile information according to the preferred embodiment of the present invention.

Next, use of the road surface profile will be described with reference to FIG. 20. As shown in FIG. 20, an information center 50 has an information providing server 51 and a communication apparatus 52. In this case, the information providing server 51 is a computer provided with computing means such as a CPU or an MPU, memory means such as a semiconductor memory, a magnetic disc or an optical disc, and a communication interface. Further, the information providing server 51 is connected to a network (not shown) via the communication apparatus 52, and can communicate with the suspension control apparatus 10 in a vehicle 11a corresponding to a vehicle A and a vehicle 11b corresponding to a vehicle B, via the network. In this case, the network may be any communication line network such as a wired or wireless public communication line network, a private communication line network, a cellular phone line network, internet, intranet, a LAN, a WAN (wide area network), a satellite communication network or a combination thereof. Further, the communication may be achieved by utilizing CS broadcasting or BS broadcasting in cooperation with a broadcasting satellite. The communication may be ground-based digital television broadcasting, FM multiplex broadcasting, or a system utilizing optical beacons or radio beacons placed along the side of the road.

The communication means of the suspension control apparatus 10 in vehicle 11a transmits the road surface profile, for the predetermined rough road section learned by the suspension control unit 30, to the information providing server 51. In this case, position information specifying the position of the rough road section is also transmitted. Then, the information providing server 51 stores the road surface profile of the rough road section in the memory means, and registers the rough road section. Subsequently, when the suspension control apparatus 10 of the vehicle 11b traveling toward the rough road section transmits a request for the road surface profile to the information providing server 51, the information providing server 51 transmits the road surface profile of the rough road section corresponding to the registered section to the suspension control apparatus 10 of the vehicle 11b. Accordingly, the suspension control unit 30 of the suspension control apparatus 10 of the vehicle 11b can execute suitable suspension control based on the road surface profile of the rough road section received by the communication means.

As mentioned above, it is possible to upload the road surface profile learned by the suspension control unit 30 of one vehicle 11a onto the network to enable distribution of the learned profile to the suspension control apparatus 10 of vehicle 11b and other vehicles. Accordingly, even in the case where a road section is only temporarily a "rough road section," e.g., due to road construction, the first vehicle 11a to travel that section registers it in the information providing server 51, whereby the suspension control apparatus 10 of other vehicles, e.g., vehicle 11b, can execute advance control corresponding to the rough road section. In other words, it is possible to properly execute the advance control of the suspension by registering the road surface profile in the information providing server 51 so as to share the road surface profile in common.

Further, in the case where the information providing server 51 stores information such as traffic information, road construction information and/or disaster information, such as a VICS (R), it is possible to share the road surface profile in common with a higher precision, by combining such information with the road surface profile for the registered section.

Figure 21:
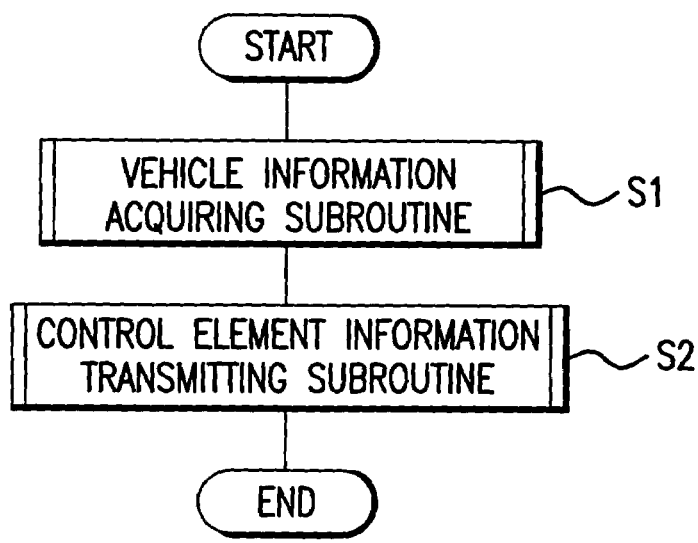
FIG. 21 is a flow chart of a routine for processing output from a sensor unit according to the preferred embodiment of the present invention.

A routine executed by the suspension control apparatus 10 of the vehicle is shown in FIG. 21. As shown in FIG. 21, first, the sensor unit 20 executes vehicle information acquisition. The vehicle information acquisition involves acquiring the travel environment information corresponding to the vehicle information output by the navigation apparatus 21, and the travel state information corresponding to the vehicle information output by the vehicle speed sensor 24, the steering sensor 25, the turn signal sensor 26, the accelerator sensor 27, the brake sensor 28 and the vehicle weight sensor 29.

The navigation apparatus 21 detects the current position of the vehicle 11 corresponding to its own position, searches for a route to the destination, provides guidance for travel of the route, determines the specified section, searches points and/or facilities, displays a map on the screen of the display means, displaying the current position of the vehicle 11, the route from the current position to the destination and information for guidance along the route on the map. Further, if it is determined that the vehicle 11 has reached a predetermined position close and in advance of the registered section based on the current position of the vehicle 11, the navigation apparatus 21 starts execution of a travel environment recognition routine (step S1). The travel environment recognition routine involves processing the travel environment information required for the suspension control, such as the length of the registered section and the road surface profile.

The sensor unit 20 transmits travel environment information and travel state information which correspond to the control element information to the suspension control unit 30 (step S2).

Thus, in step S1, vehicle information acquisition routine is executed and in step S2, the control element information transmitting routine is executed, and the routine is finished.

Figure 22:
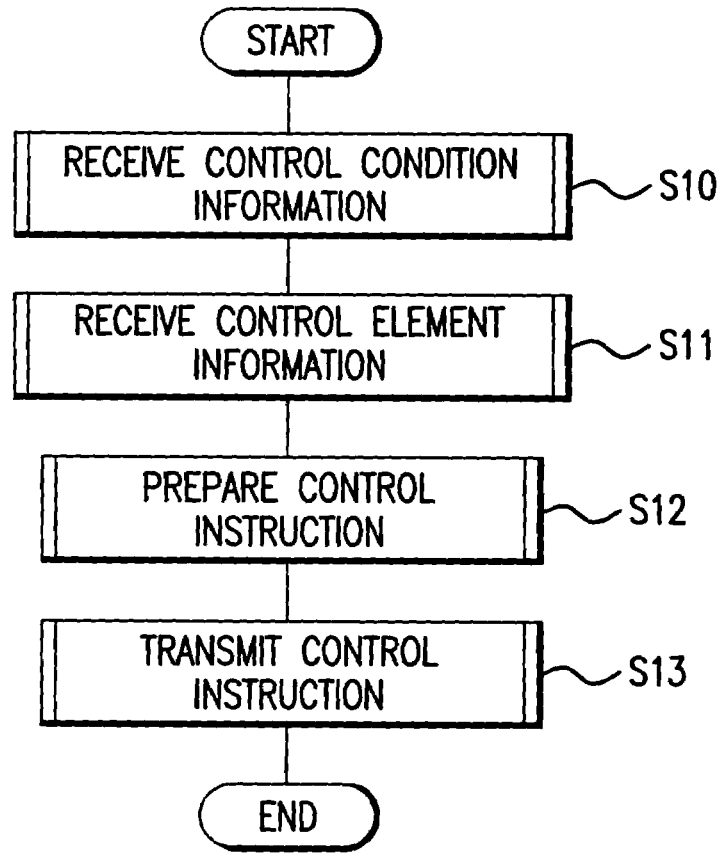
FIG. 22 is a flow chart of a main routine executed by a suspension control unit in the preferred embodiment of the present invention.

FIG. 22 is a flow chart of the routine executed by the suspension control unit 30 as step S1 in FIG. 21. First, the suspension control unit 30 receives and processes the control condition information transmitted by the suspension unit 40 (step S10). Accordingly, the suspension control unit 30 acquires information for vertical acceleration of the spring upper portion as output by the vertical acceleration sensor 41, and the results of control executed by the damping force adjusting mechanism 42, the spring rate adjusting mechanism 43 and the vehicle height adjusting mechanism 44.

Subsequently, the suspension control unit 30 processes the control element information received from the sensor unit 20 (step S11). Accordingly, the suspension control unit 30 acquires the travel environment information such as the length of the registered section and the road surface profile, and the travel state information output by the vehicle speed sensor 24, the steering sensor 25, the turn signal sensor 26, the accelerator sensor 27, the brake sensor 28 and the vehicle weight sensor 29.

Subsequently, the suspension control unit 30 prepares an optimum control instruction based on the travel environment information, the travel state information and the previous control result which correspond to the control element information (step S12).

Subsequently, the suspension control unit 30 transmits the control instruction to the suspension unit 40 corresponding to the unit to be controlled (step S13).

Summarizing, in step S10, the control condition information receiving processing is executed;

in step S11, the control element information receiving processing is executed;

in step S12, the control instruction preparing processing is executed; and in step S13, the control instruction transmitting processing is executed and the processing is finished.

Figure 23:
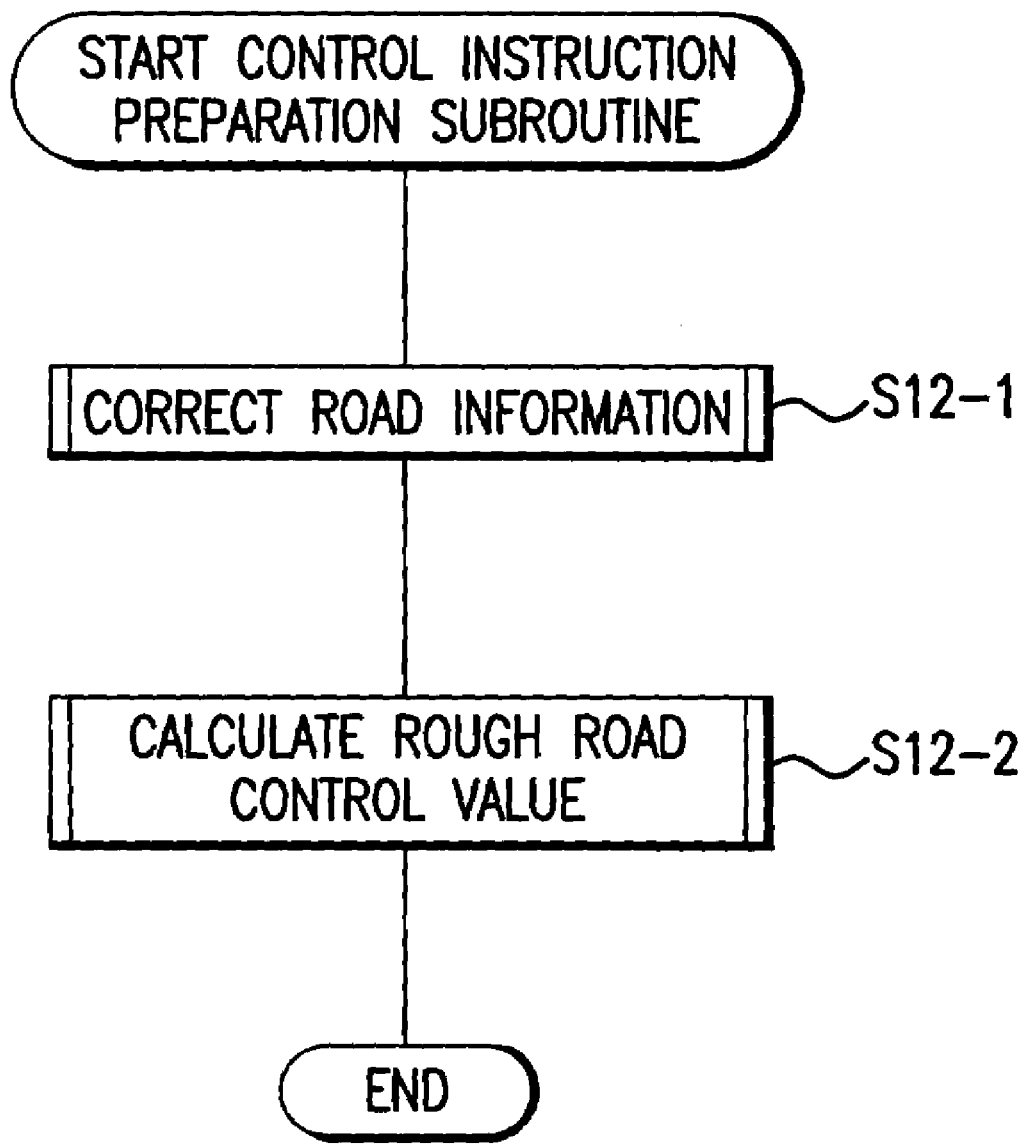
FIG. 23 is a flow chart of a subroutine for preparing instruction (step S12 in FIG. 22) in the preferred embodiment of the present invention.

A subroutine for the control instruction preparation (step S12 in FIG. 22) is shown in FIG. 23. First, the suspension control unit 30 determines and corrects error by comparing the actual road information with the road information stored in the map data base, based on the control condition information received from the suspension unit 40, and the control element information received from the sensor unit 20 (step S12-1). In this case, the road information correcting routine is utilized in learning the road shape.

Next, the suspension control unit 30 executes calculation of a rough road optimum control value for a rough road section included in the control instruction transmitted to the suspension unit 40, based on the control element information received from the sensor unit 20 (step S12-2). In this case, the rough road control value calculation is utilized in executing the advance control of the suspension on the rough road.

Figure 24:
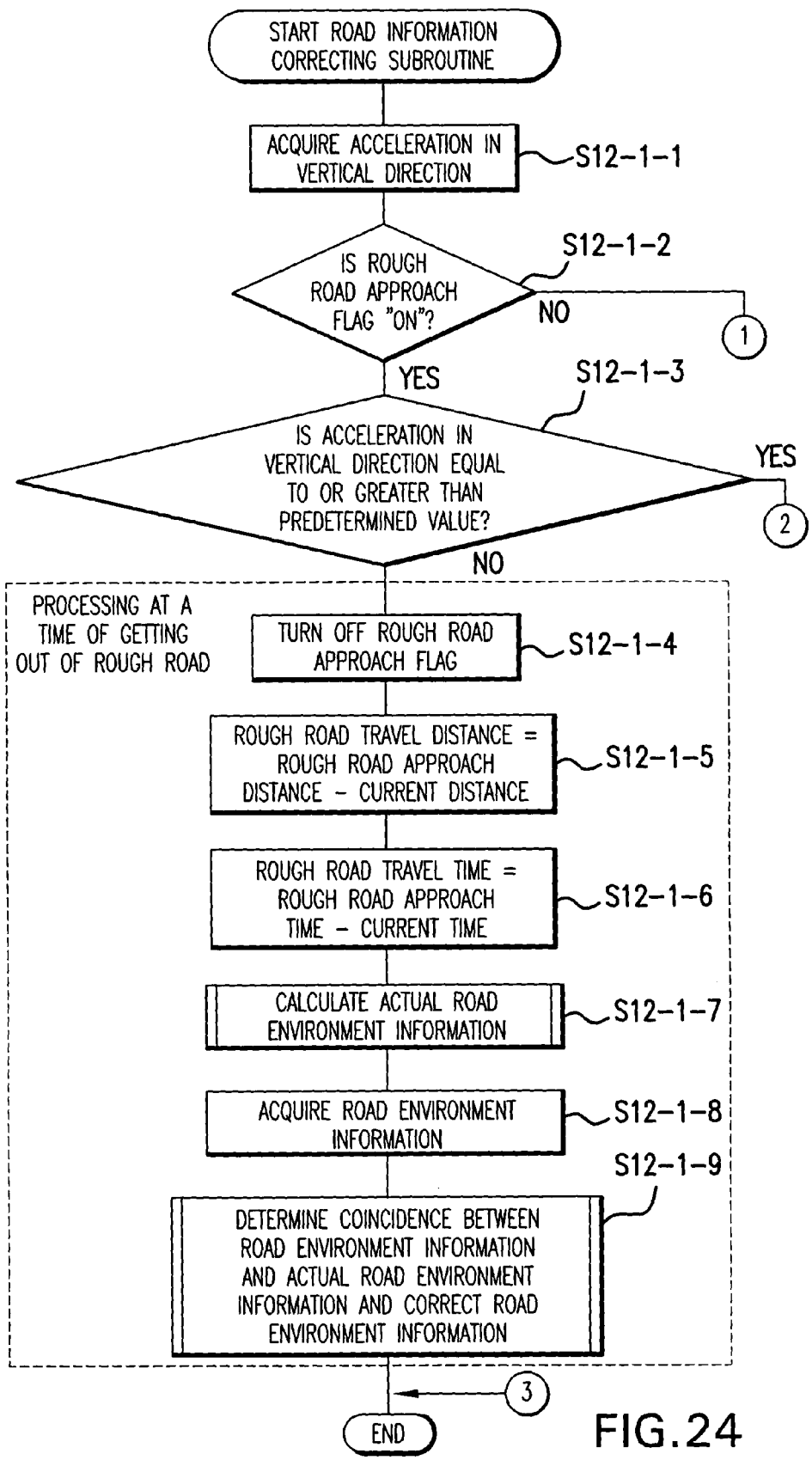
FIG. 24 is a flow chart showing a first portion of a subroutine for correcting road information according to the preferred embodiment of the present invention.
Figure 25:
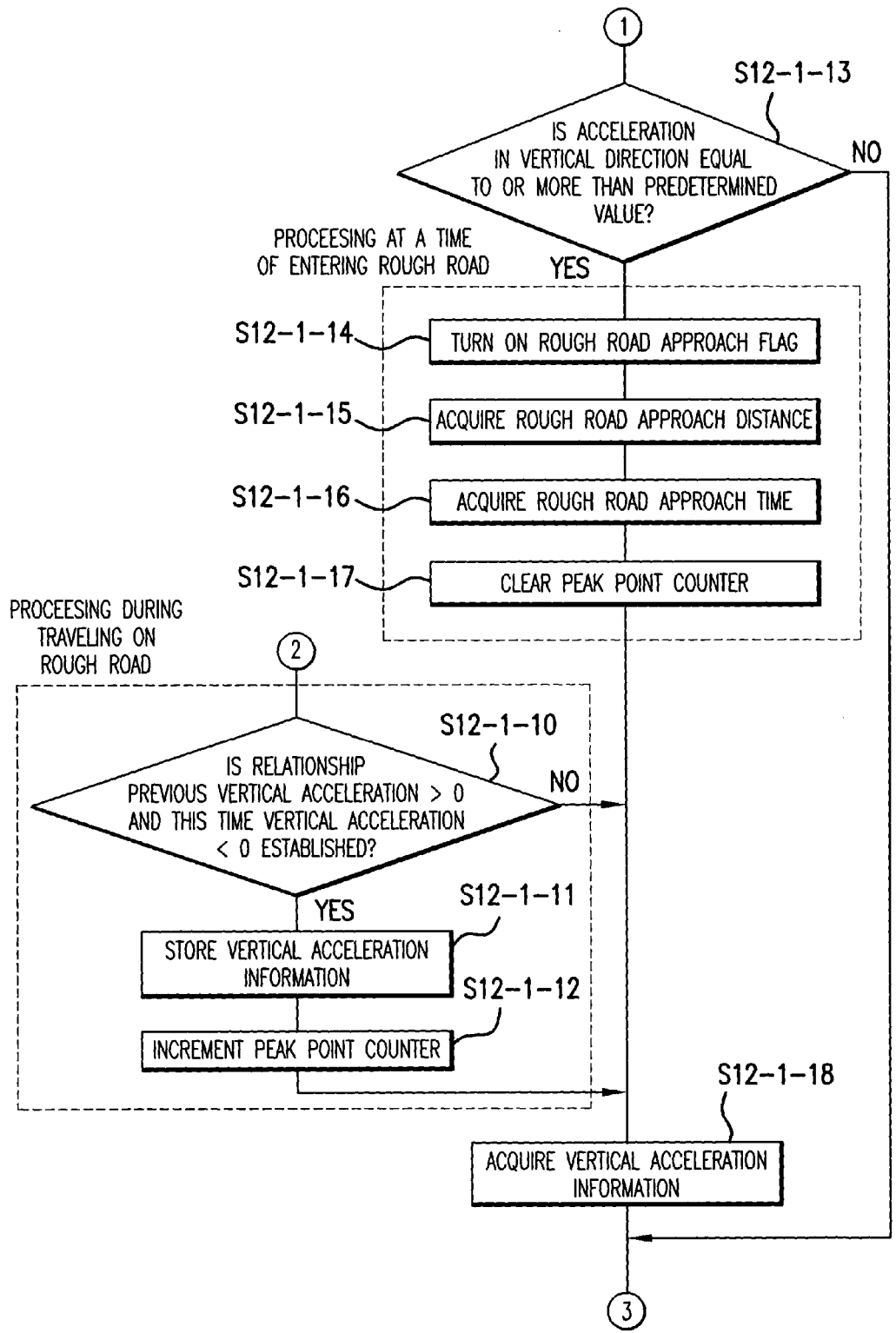
FIG. 25 is a flow chart showing the remainder of the subroutine of FIG. 24.

A subroutine for the road information correction (S12-1 in FIG. 23) is illustrated by the flow charts shown in FIGS. 24 and 25. The road information correction subroutine (FIGS. 24 and 25) is executed once every current position renewal interval, e.g., each 100 meters. First, the suspension control unit 30 acquires the vertical acceleration output by the vertical acceleration sensor 41 of the suspension unit 40 (step S12-1-1). Subsequently, the suspension control unit 30 determines whether or not a rough road approach flag is "ON" (step S12-1-2). The rough road approach flag is a flag for determining whether or not the current position of the vehicle 11 is within the rough road section, i.e., is turned "ON" in the case that the vehicle 11 has entered the rough road section, and is turned "OFF" in the case that the vehicle 11 has left the rough road section.

In the case that the rough road approach flag is in the "ON" state, the suspension control unit 30 proceeds to step S12-1-3 wherein it determines whether or not the vertical acceleration is equal to or greater than a predetermined value. If "OFF" the routine proceeds to step S12-1-13. The predetermined value utilized in step S12-1-3 is a value for determining whether or not the current position of the vehicle 11 is within the rough road section, and generally expresses the magnitude of a minimum vibration which can be felt by a human, 0.05 m/s$^2$ for example, but can be appropriately changed. In the case that the vertical acceleration is not equal to or greater than the predetermined value, the suspension control unit 30 determines that the current position of the vehicle 11 is not within the rough road section and has left the rough road section, and turns "OFF" the rough road approach flag (step S12-1-4). Subsequently, it calculates a difference between a distance from a predetermined position to the position where the vehicle 11 has entered the rough road, that is, a rough road approach distance, and a distance from the predetermined position to the current position of the vehicle 11, that is, a current distance, and sets the difference as a rough road travel distance (S12-1-5). Subsequently, it calculates a difference between the time when the vehicle 11 entered the rough road, that is, a rough road approach time, and the current time, and sets the difference as a rough road travel time (S12-1-6). It then calculates actual road environment information including the amplitude of the road surface and the wavelength (S12-1-7). Subsequently, it acquires the road environment information, including the amplitude of the road surface and the wavelength, stored in the memory means (S12-1-8). It then executes coincidence determination by comparing the stored road environment information with the actual road environment information, and corrects the stored road environment information accordingly (S12-1-9). After passing through the rough road section, the suspension control unit 30 finishes the road information correction subroutine.

As mentioned above, when the detected vertical acceleration is equal to or greater than the predetermined value, the suspension control unit 30 determines that the vehicle 11 is traveling on a rough road section, and executes control for travel on the rough road.

In execution of the control routine for travel on a rough road, the suspension control unit 30 first determines whether or not the previous trip acceleration at every current position renewal interval (renewal time) is positive and vertical acceleration at every current position renewal interval in the current trip is negative. If such a condition is not satisfied, the control processing for travel on a rough road is terminated. However, if such condition is satisfied, the suspension control unit 30 stores the vertical acceleration information for both the previous trip and the current trip at every current position renewal interval (S12-1-11). Subsequently, the suspension control unit 30 increments the peak point counter (S12-1-12), that is, increases the count of the peak point counter, and finishes the routine for travel on a rough road. The peak point counter counts peaks in the rough road section.

Further, the suspension control unit 30 acquires the vertical acceleration information after finishing the routine for travel on the rough road, and finishes the road information correcting routine (S12-1-18).

As mentioned above, in the case that the rough road approach flag is "OFF", the suspension control unit 30 determines whether or not the vertical acceleration is equal to or greater than a predetermined value (S12-1-13). The predetermined value is the same as the predetermined value mentioned above. In the case that it is not equal to or greater than the predetermined value, the suspension control unit 30 terminates the road information correction routine. In the case that it is equal to or greater than the predetermined value, the suspension control unit 30 determines that the vehicle 11 has entered the rough road section and starts execution of routine at the time of entering the rough road section for initializing or storing the information required for calculating the shape of the rough road.

The suspension control unit 30 first turns on the rough road approach flag at the time of entering the rough road. Subsequently, it acquires the rough road approach distance and acquires the rough road approach time (S12-1-14). It then clears the peak point counter and finishes the preparation for entering the rough road section (S12-1-17).

The suspension control unit 30 acquires the vertical acceleration information after finishing the processing for entering the rough road section, and finishes the road information correcting routine of FIG. 24.

The routine of FIGS. 24 and 25 is summarized as follows:

In step S12-1-1, the vertical acceleration is acquired.

In step S12-1-2, it is determined whether or not the rough road approach flag is "ON". In the case that the rough road approach flag is "ON", the routine proceeds to step S12-1-3, and in the case that the rough road approach flag is "OFF", the routine proceeds to step S12-1-13.

In step S12-1-3, it is determined whether or not the vertical acceleration is equal to or more than the predetermined value. In the case that the vertical acceleration is equal to or more than the predetermined value, the routine proceeds to step S12-1-10, and in the case that the vertical acceleration is smaller than the predetermined value, the routine proceeds to step S12-1-4.

In step S12-1-4, the rough road approach flag is turned "OFF".

In step S12-1-5, the rough road travel distance is calculated by subtracting the current distance from the rough road approach distance.

In step S12-1-6, the rough road travel time is calculated by subtracting the current time from the rough road approach time.

In step S12-1-7, the actual road environment information is calculated.

In step S12-1-8, the road environment information is acquired.

In step S12-1-9, the coincidence between the road environment information is determined, the actual road environment information and the road environment information correcting routine is executed, and the processing is finished.

In step S12-1-10, it is determined whether or not the previous vertical acceleration is larger than 0 and current vertical acceleration is smaller than 0. In the case that the previous vertical acceleration is larger than 0 and current vertical acceleration is smaller than 0, the routine proceeds to step S12-1-11, and in the case that the previous vertical acceleration is equal to or less than 0 and current vertical acceleration is equal to or more than 0, the routine proceeds to step S12-1-18.

In step S12-1-11, the vertical acceleration information is stored.

In step S12-1-12, the peak point counter is incremented.

In step S12-1-13, it is determined whether or not the vertical acceleration is equal to or more than the predetermined value. In the case that the vertical acceleration is equal to or more than the predetermined value, the routine proceeds to step S12-1-14, and in the case that the vertical acceleration is smaller than the predetermined value, the processing is finished.

In step S12-1-14, the rough road approach flag is turned "ON".

In step S12-1-15, the rough road approach distance is acquired.

In step S12-1-16, the rough road approach time is acquired.

In step S12-1-17, the peak point counter is cleared.

In step S12-1-18, the vertical acceleration information is acquired, and the processing is finished.

Figure 26:
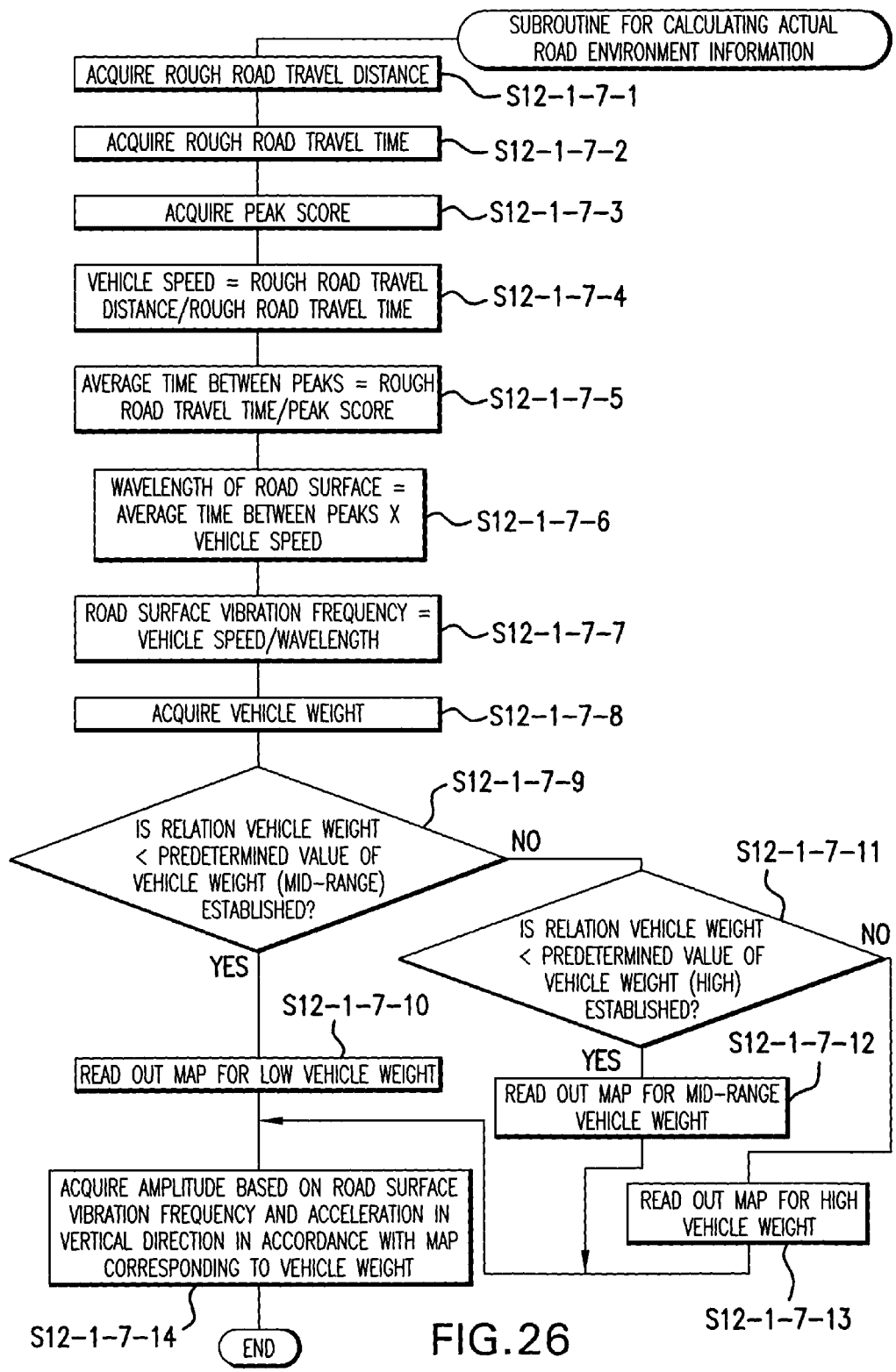
FIG. 26 is a flow chart of the subroutine of step S12-1-7 (FIG. 24) for processing actual road environment information according to the preferred embodiment of the present invention.

A subroutine for actual road environment information calculating (step S12-1-7 in FIG. 24) is shown in FIG. 26. In the subroutine of FIG. 26 the suspension control unit 30 first calculates the road surface wavelength from the rough road travel distance, the rough road travel time, and the peak score.

In the wavelength calculating, the suspension control unit 30 first acquires the rough road travel distance (step S12-1-7-1), acquires the rough road travel time (step S12-1-7-2), and acquires the peak score (S12-1-7-3). Subsequently, it calculates the vehicle speed V by dividing the rough road travel distance by the rough road travel time (step S12-1-7-4), calculates an average time between the peaks by dividing the rough road traveling time by the peak score (step S12-1-7-5), and calculates the wavelength λ of the road surface by multiplying the average time between the peaks by the vehicle speed V (step S12-1-7-6). Stated differently, the vehicle speed V, the average time between the peaks and the wavelength λ of the road surface can be determined in accordance with the following formulas (4) to (6).

Vehicle speed $V$=rough road travel distance/rough road travel time (4)

Average time between peaks=rough road travel time/peak score (5)

Wavelength $\lambda$ of road surface=average time between peaks×vehicle speed $V$ (6)

Subsequently, the suspension control unit 30 calculates road surface amplitude Y based on the road surface vibration frequency N determined from the calculated wavelength λ of the road surface and the vehicle speed V, and the control map determined from the vehicle weight.

In the road surface amplitude calculating routine, the suspension control unit 30 first calculates the road surface vibration frequency N by dividing the vehicle speed V by the wavelength λ of the road surface, in accordance with the formula (1) (step S12-1-7-7). Subsequently, it acquires the vehicle weight (step S12-1-7-8), and determines whether or not the vehicle weight is less than a predetermined value defining a mid-range vehicle weight (step S12-1-7-9). In the case that the vehicle weight is less than the predetermined value, the suspension control unit 30 determines that the vehicle weight is low. In the case that the vehicle weight is not less than the predetermined value defining the mid-range vehicle weight, the suspension control unit 30 determines whether or not the vehicle weight is less than a predetermined value defining a high vehicle weight. In the case that the vehicle weight is less than the predetermined value defining the high vehicle weight, the suspension control unit 30 determines that the vehicle weight is mid-range. In the case that the vehicle weight is not less than the predetermined value defining the high vehicle weight, the suspension control unit 30 determines that the vehicle weight is high.

In this case, the predetermined values defining the mid-range vehicle weight and the high vehicle weight are the same as the reference values utilized by the suspension control unit 30 to determine that the vehicle weight is mid-range or high in the learning of the road surface profile described above. Further, the predetermined values defining mid-range vehicle weight and high vehicle weight, used to differentiate between high, mid-range and low vehicle weights may be set in accordance with the type of the vehicle, or may be defined to correspond to the number of passengers for each type of vehicle.

In the case that the suspension control unit 30 determines that the vehicle weight is low, it reads out the learning map for low vehicle weight, as shown in FIG. 19, from the memory means (step S12-1-7-10). In the case that it determines that the vehicle weight is mid-range (medium), it reads out the learning map for mid-range vehicle weight, as shown in FIG. 18, from the memory means (step S12-1-7-12). Where it determines that the vehicle weight is high, it reads out the learning map for high vehicle weight, as shown in FIG. 17, from the memory means (step S12-1-7-13). Further, it acquires the amplitude of the road surface based on the road surface vibration frequency N and the vertical acceleration, in accordance with the learning map corresponding to the vehicle weight (step S12-1-7-14).

Thus, the subroutine for calculating actual road environment information (FIG. 26) proceeds as follows.

In step S12-1-7-1, the rough road travel distance is acquired.

In step S12-1-7-2, the rough road travel time is acquired.

In step S12-1-7-3, the peak score is acquired.

In step S12-1-7-4, the vehicle speed V is calculated.

In step S12-1-7-5, the average time between the peaks is calculated.

In step S12-1-7-6, the wavelength λ of the road surface is calculated.

In step S12-1-7-7, the road surface vibration frequency N is calculated.

In step S12-1-7-8, the vehicle weight is acquired.

In step S12-1-7-9, it is determined whether or not the vehicle weight is smaller than the predetermined value for mid-range vehicle weight. In the case that the vehicle weight is smaller than the predetermined value for mid-range vehicle weight, the routine proceeds to step S12-1-7-10, and in the case that the vehicle weight is equal to or more than the predetermined value for mid-range vehicle weight, the routine proceeds to step S12-1-7-11.

In step S12-1-7-10, the map for low vehicle weight is read out.

In step S12-1-7-11, it is determined whether or not the vehicle weight is smaller than the predetermined value for high vehicle weight. In the case that the vehicle weight is smaller than the predetermined value for high vehicle weight, the routine proceeds to step S12-1-7-12, and in the case that the vehicle weight is equal to or more than the predetermined value for high vehicle weight, the routine proceeds to step S12-1-7-13.

In step S12-1-7-12, the map for mid-range vehicle weight is read out.

In step S12-1-7-13, the map for high vehicle weight is read out.

In step S12-1-7-14, the amplitude is acquired based on the road surface vibration frequency N and the vertical acceleration from the map corresponding to the vehicle weight, and the subroutine is finished.

Figure 27:
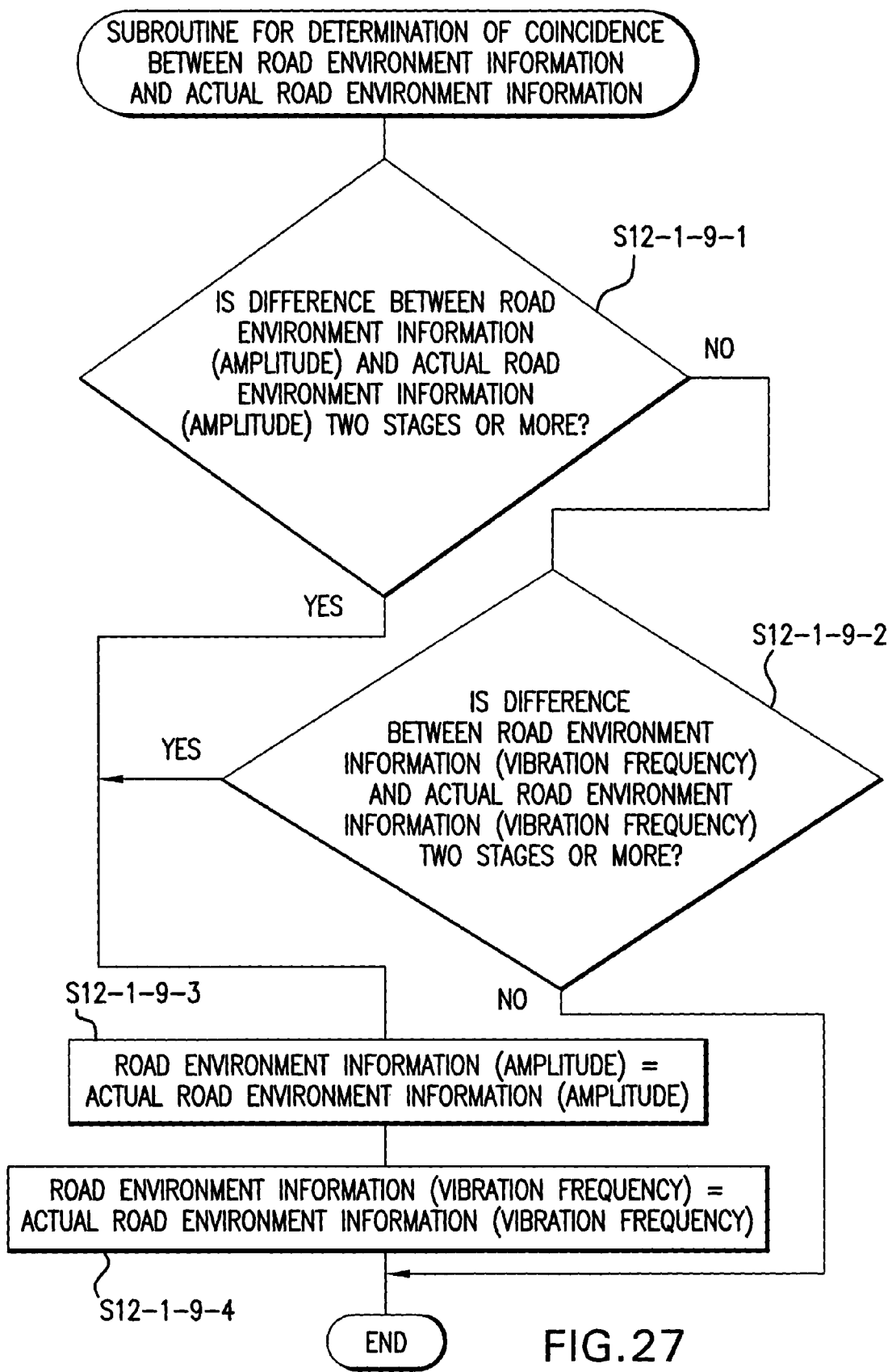
FIG. 27 is a flow chart of the subroutine of step S12-1-9 (FIG. 24) for determining coincidence between stored road environment information and actual road environment information and correcting road environment information, according to the preferred embodiment of the present invention.

The subroutine for determining coincidence between the road environment information acquired from memory in step S12-1-7-4 and the actual road environment information and correction of the road environment information acquired from memory (step S12-1-9 in FIG. 24) is shown as a flow chart in FIG. 27. By execution of the subroutine illustrated in FIG. 27, the suspension control unit 30 determines error as a difference between the calculated actual road environment information, and the road environment information acquired from memory.

In accordance with the subroutine of FIG. 27, the suspension control unit 30 first determines whether or not the road surface amplitude included in the road environment information acquired from memory and the road surface amplitude included in the actual road environment information differ by two stages or more (S12-1-9-1). For example, it determines whether or not the road surface amplitude included in the road environment information acquired from memory is high, and the road surface amplitude included in the actual road environment information is low. In this case, it is assumed that road surface amplitudes are classified into three stages as high, mid-range or low, as shown in FIGS. 17 to 19. Further, it is assumed that a difference of two or more stages is significant, and a difference of one stage is not significant. The number of stages determining a significant difference can be appropriately changed for different rough road sections.

If the difference is two stages or more, the suspension control unit 30 corrects the road surface amplitude stored in memory in accordance with the actual road environment information (S12-1-9-3) and subsequently corrects the road surface vibration frequency included in the road environment information stored in memory in accordance with the road surface vibration frequency included in the actual road environment information. In other words, it corrects the road environment information in memory in accordance with the actual road environment information (step S12-1-9-2 and step S12-1-9-4). The coincidence determination subroutine is then finished.

If the difference between the road surface amplitude included in the road environment information in memory and the road surface amplitude included in the actual road environment information is not at least two stages, the suspension control unit 30 determines whether or not the difference between the road surface vibration frequency included in the road environment information in memory and the road surface vibration frequency included in the actual road environment information corresponds to two stages or more (step S12-1-9-2). For example, it determines whether or not the road surface vibration frequency included in the stored map road environment information is high, and the road surface vibration frequency included in the actual road environment information is low. In this case, it is assumed that the road surface vibration frequencies are classified into three stages as high, mid-range and low, as shown in FIGS. 17 to 19. Further, it is assumed that a difference of two stages or more is significant, and a difference of one stage is not significant. In this case, the number of stages used in rating different levels of road surface vibration and the number of stages determining a significant difference can be appropriately changed for different rough road sections. In other words, while three stages (small, middle and large) are exemplified in FIGS. 17, 18 and 19, further division into four or more stages is possible.

If the difference is two stages or more, the suspension control unit 30 corrects the stored map road environment information in accordance with the actual road environment information, and finishes the coincidence determination and road environment information correction. If the difference is two stages or more, the suspension control unit 30 does not correct the stored map road environment information, and finishes the coincidence determination and the road environment information correction.

Summarizing, the subroutine of FIG. 27, in step S12-1-9-1, it is determined whether or not the difference between the stored road amplitude and the actual road amplitude is two stages or more. In the case that a difference between the stored road amplitude and the actual road amplitude is two stages or more, the routine proceeds to step S12-1-9-3, and in the case that the difference is not at least two stages, the routine proceeds to step S12-1-9-2.

In step S12-1-9-2, it is determined whether or not the difference between the stored road vibration frequency and the actual road vibration frequency is two stages or more. If the difference between the stored road vibration frequency and the actual road vibration frequency is two stages or more, the routine proceeds to step S12-1-9-3, and if the difference is not at least two stages, the subroutine is finished.

In step S12-1-9-3, the stored road amplitude is changed to the actual road amplitude.

In step S12-1-9-4, the stored road vibration frequency is changed to the actual road vibration frequency, and the subroutine is finished.

Figure 29:
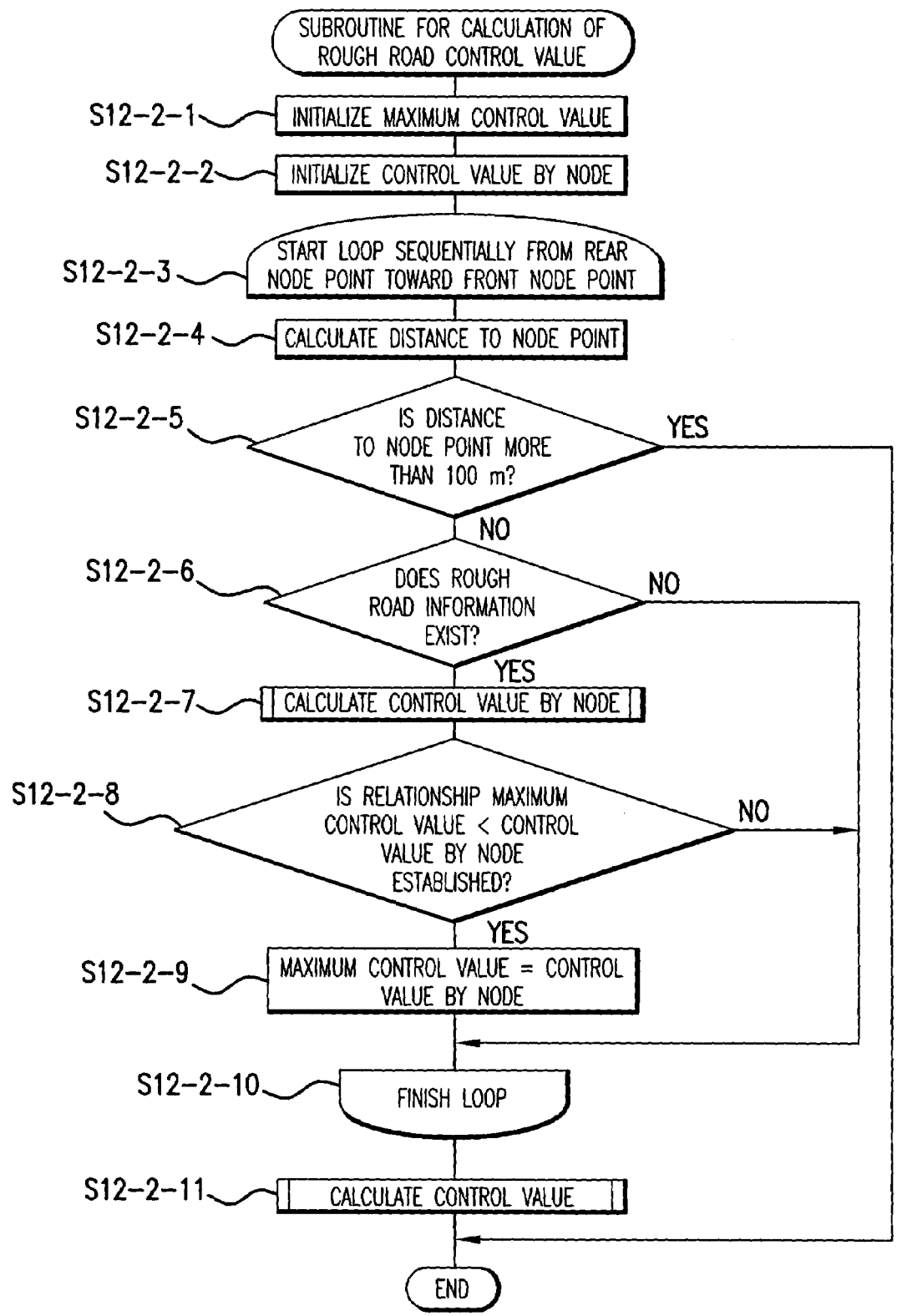
FIG. 29 is a flow chart of the subroutine of Step S12-2 (FIG. 23) for calculating a rough road control value according to the preferred embodiment of the present invention.

A subroutine for calculating a rough road control value (step S12-2 in FIG. 23) is illustrated by the flow chart of FIG. 29.

Figure 28:
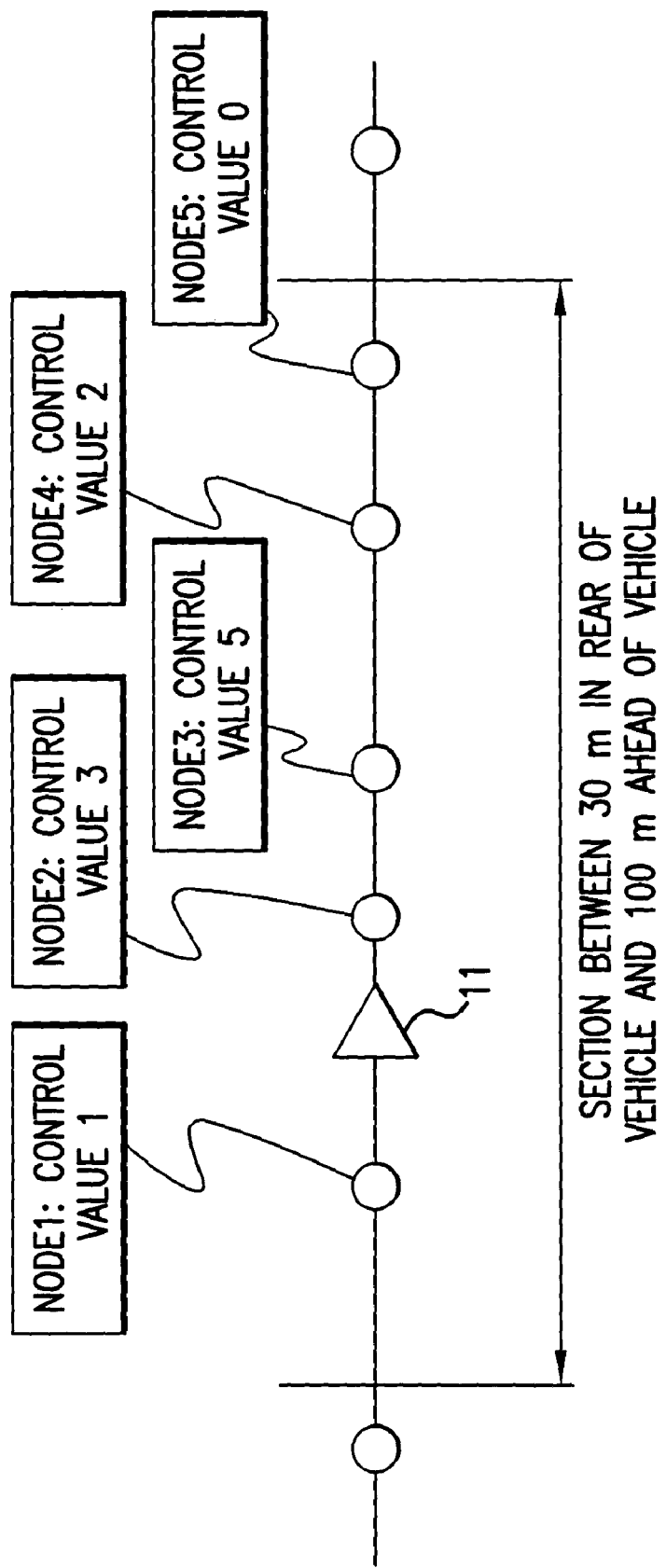
FIG. 28 shows the relationship between a current position and a node point in calculating a rough road control value according to the preferred embodiment of the present invention.

FIG. 28 shows a relationship between a current position and a node point used in the rough road control value calculation.

The subroutine for calculating the rough road control value is executed each time the current position is renewed (determined), e.g., every 100 meters. In other words, the suspension control unit 30 repeatedly executes the rough road value calculation of the rough road control value, i.e., suspension control value for a rough road section each time the current position is determined.

The suspension control unit 30 first initializes the maximum suspension control value so as to set the value to 0 (step S12-2-1), and subsequently initializes the control value for each of the node points so as to set the value to 0. Subsequently, the suspension control unit 30 sequentially calculates the control value for each node point within a range between 30 m to the rear of the current position of the vehicle 11 and 100 m ahead of the current position, as shown in FIG. 28. Further, it compares this most recent control value for each node, calculated every time current position is renewed, with the previously calculated maximum control value (the initial value=0) and sets the larger of the two valves as the maximum control value, thus renewing the maximum control value. In this case, the maximum control value is a value which does not allow a sense of discomfort at a point where discomfort is most frequently felt, and is experimentally determined. In the embodiment shown in FIG. 28, for example, the maximum control value is 5.

In this case, the suspension control unit 30 starts execution of a control loop, i.e., sequential execution from the furthest rear node point within a range from 30 m to the rear of the current position of the vehicle 11 to 100 m ahead of the current position, toward the furthest front node point (step S12-2-3). In other words, in the example shown in FIG. 28, the control loop is sequentially executed for each of the node points, from the node point 1 to the node point 5.

In the control loop mentioned above, the suspension control unit 30 first calculates the distance from the current position to the node point to be processed (subject node) (S12-2-4). Subsequently, it determines whether or not the distance to the node point is more than +100 m, that is, whether or not the node point is within a range extending to 100 m ahead of the current position (step S12-2-5). In the case that it is within that range, the suspension control unit 30 then determines whether or not the node point is in a road section registered in correlation with the rough road information (step S12-2-6). In the case that the node point is outside (beyond) that range, the suspension control unit 30 exits the control loop, and finishes the rough road control value calculating subroutine.

In the case that the node point is on a registered rough road section, the suspension control unit 30 calculates a control value for the node as described above (step S12-2-7). Further, it then determines whether or not the control value calculated for the node is larger than the maximum control value (step S12-2-8). In the case that the control value calculated for the node is larger than the maximum control value, the suspension control unit 30 renews the maximum control value calculated for the node mentioned as a new maximum control value (step S12-2-9) so as to finish the control loop for that node (step S12-2-10), and starts the control loop for the next node point.

In the case that the node is not on a registered rough road section, the suspension control unit 30 exits the loop immediately, and starts the control loop for the next node point. Further, if it is determined that the node control value is not larger than the maximum control value, the suspension control unit 30 exits the control loop immediately, and starts the control loop for the next node point.

Upon finishing the control loop for all the node points within the range between 30 m to the rear of the current position of the vehicle 11 and 100 m ahead of the current position, the suspension control unit 30 executes the control value calculating subroutine described below, calculates the optimum control value on the rough road, which is included in the control instruction transmitted to the suspension unit 40, each time the current position is renewed (step S12-2-11), and finishes the rough road control value calculating subroutine.

The subroutine for calculation of the rough road control values may be summarized as follows.

In step S12-2-1, the maximum control value is initialized.
Instep S12-2-2, the node control value is initialized.

In step S12-2-3, the loop is started in sequence from the rear node point toward the front node point.

In step S12-2-4, the distance to the node point is calculated.

In step S12-2-5, it is determined whether or not the distance to the node point is more than 100 m. If the distance to the node point is more than 100 m, the subroutine is finished. In the case that the distance to the node point is not more than 100 m, the routine proceeds to step S12-2-6.

In step S12-2-6, it is determined whether or not the node point lies on a road section registered as a rough road section. In the case that it does lie on a registered rough road section, the routine proceeds to step S12-2-7. In the case that it does not lie on a rough road section, the routine proceeds to step S12-2-10.

In step S12-2-7, it calculates the node control value.

In step S12-2-8, it is determined whether or not the maximum control value is smaller than the node control value. In the case that the maximum control value is smaller than the node control value, the routine proceeds to step S112-2-9. In the case that the maximum control value is equal to or larger than the node control value, the routine proceeds to step S12-2-10.

In step S12-2-9, the maximum control value is reset equal to the node control value.

In step S12-2-10, the control loop is finished.

In step S12-2-11, it calculates the control value, and finishes the routine.

Figure 30:
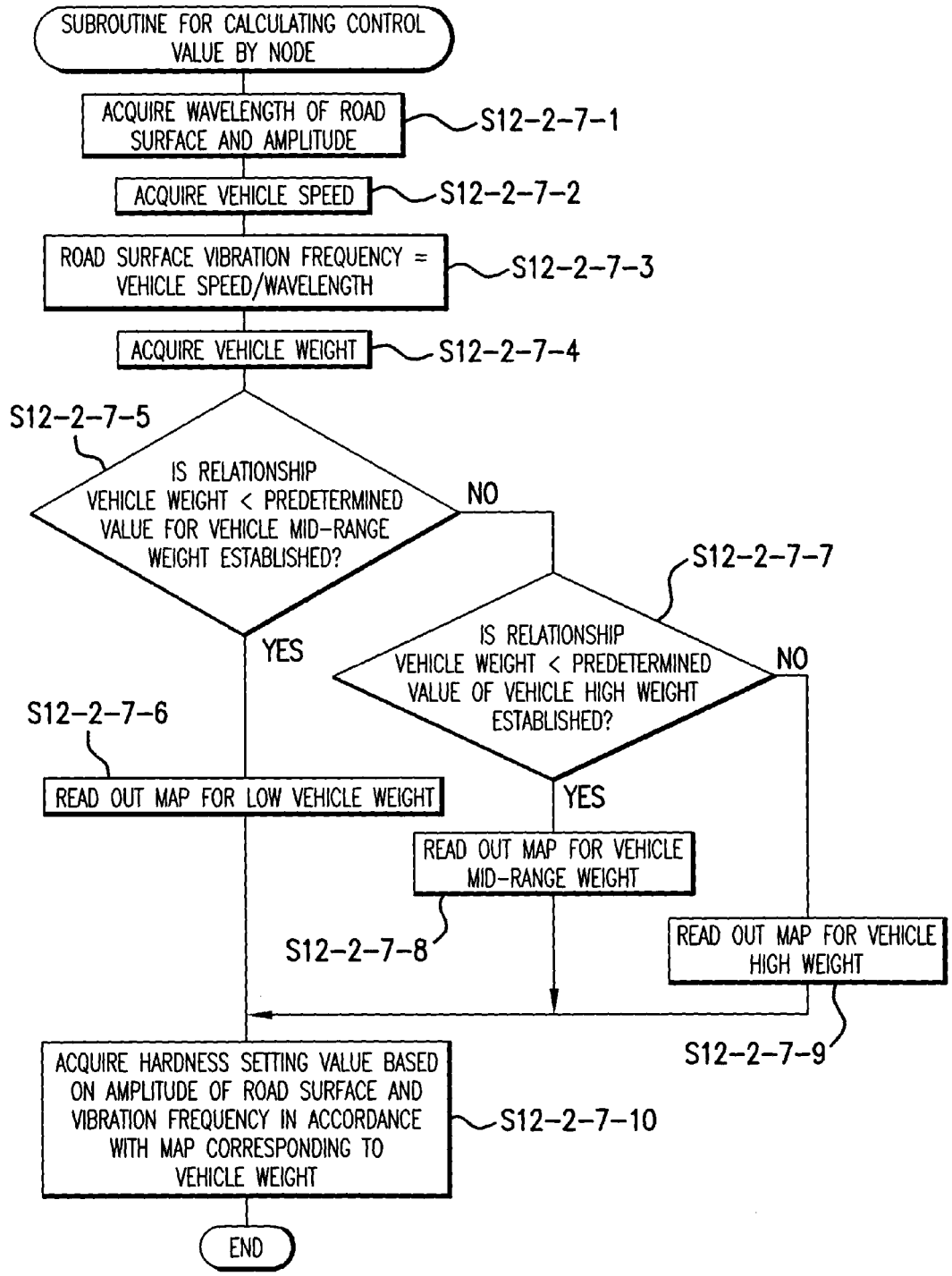
FIG. 30 is a flow chart of the subroutine of step S12-2-7 (FIG. 29) for calculating a control value by node according to the preferred embodiment of the present invention.

The subroutine for calculating control values by node (step S12-2-7 in FIG. 29) illustrated as a flow chart in FIG. 30.

In the subroutine illustrated in FIG. 30, the suspension control unit 30 calculates a damping force adjusting value specific for the forward road surface based on the wavelength and amplitude information for that road surface stored in the memory means, the vehicle speed and the vehicle weight. The suspension control unit 30 determines the road surface vibration frequency N, selects the map for adjusting the damping force from the vehicle weight, and determines the damping force adjusting value corresponding to the road surface vibration frequency N and the road surface amplitude Y, based on the selected map.

In executing the subroutine of FIG. 30 the suspension control unit 30 first acquires the wavelength $\lambda$ of the road surface and the road surface amplitude Y (step S12-2-7-1), and subsequently acquires the vehicle speed V (step S12-2-7-1). Further, it calculates the road surface vibration frequency N by dividing the vehicle speed V by the wavelength $\lambda$ (step S12-2-7-3). Stated differently, the road surface vibration frequency N is determined in accordance with the following formula (7).

Road surface vibration frequency $N$=vehicle speed $V$/wavelength $\lambda$ (7)

Subsequently, the suspension control unit 30 acquires the vehicle weight (step S12-2-7-4), and determines whether or not the vehicle weight is less than the predetermined value defining the mid-range (medium) vehicle weight (step S12-2-7-5). Further, in the case that the vehicle weight is less than the predetermined value defining the mid-range vehicle weight, it determines that the vehicle weight is low. In the case that the vehicle weight is not less than the predetermined value defining the mid-range vehicle weight, the suspension control unit 30 determines whether or not the vehicle weight is less than the predetermined value defining high vehicle weight (step S12-2-7-2). In the case that the vehicle weight is less than the predetermined value defining high vehicle weight, the suspension control unit 30 determines that the vehicle weight is mid-range. In the case that the vehicle weight is not less than the predetermined value defining the high vehicle weight, the suspension control unit 30 determines that the vehicle weight is high.

The predetermined values defining the mid-range (medium) and high vehicle weights are the same as the reference values used in the suspension control based on the vehicle weight information previously described.

In the case that the suspension control unit 30 determines that the vehicle weight is low, it reads out the suspension control map for low vehicle weight as shown in FIG. 11 from the memory means (step S12-2-7-6). Further, in the case that it determines that the vehicle weight is mid-range (medium), it reads out the suspension control map for mid-range vehicle weight as shown in FIG. 10 from the memory means (step S12-2-7-8). In like manner, in the case that it determines that the vehicle weight is high, it reads out the suspension control map for high vehicle weight as shown in FIG. 9 from the memory means (step S12-2-7-9). Further, it acquires a hardness setting value (suspension control value) as the node control value by applying road surface amplitude Y and the road surface vibration frequency N for the node to the suspension control map read out from memory as corresponding to the determined vehicle weight (step S12-2-7-10).

The subroutine of the flow chart of FIG. 30 is summarized as follows.

In step S12-2-7-1, the wavelength λ of the road surface and the amplitude Y are acquired for a node point.

In step S12-2-7-2, the vehicle speed V is acquired.

In step S12-2-7-3, the road surface vibration frequency N is calculated.

In step S12-2-7-4, the vehicle weight is acquired.

In step S12-2-7-5, it is determined whether or not the vehicle weight is smaller than the predetermined value for the mid-range vehicle weight. In the case that the vehicle weight is smaller than the predetermined value for mid-range vehicle weight, the routine proceeds to step S12-2-7-6, and in the case that the vehicle weight is equal to or more than the predetermined value for mid-range vehicle weight, the routine proceeds to step S12-2-7-7.

In step S12-2-7-6, the map for low vehicle weight is read out.

In step S12-2-7-7, it is determined whether or not the vehicle weight is smaller than the predetermined value defining high vehicle weight. In the case that the vehicle weight is smaller than the predetermined value for high vehicle weight, the routine proceeds to step S12-2-7-8, and in the case that the vehicle weight is equal to or more than the predetermined value for high vehicle weight, the routine proceeds to step S12-2-7-9.

In step S12-2-7-8, the map for the mid-range vehicle weight is read out.

In step S12-2-7-9, the map for the high vehicle weight is read out.

In step S12-2-7-10, the hardness setting value is acquired based on the amplitude of the road surface and the road surface vibration frequency from the map corresponding to the vehicle weight, and execution of the subroutine is finished.

A subroutine for the control value calculation (step S12-2-11 in FIG. 29) will now be described with reference to the flow chart of FIG. 31. When there is a large difference between the current suspension control value and the maximum control value, a sense of discomfort is felt by passengers in the vehicle 11 if the suspension control value is set to the maximum control value. Accordingly, a maximum increment of change is made to the suspension control valve so as to prevent a sense of discomfort from being felt by the passengers in the vehicle 11.

Figure 31:
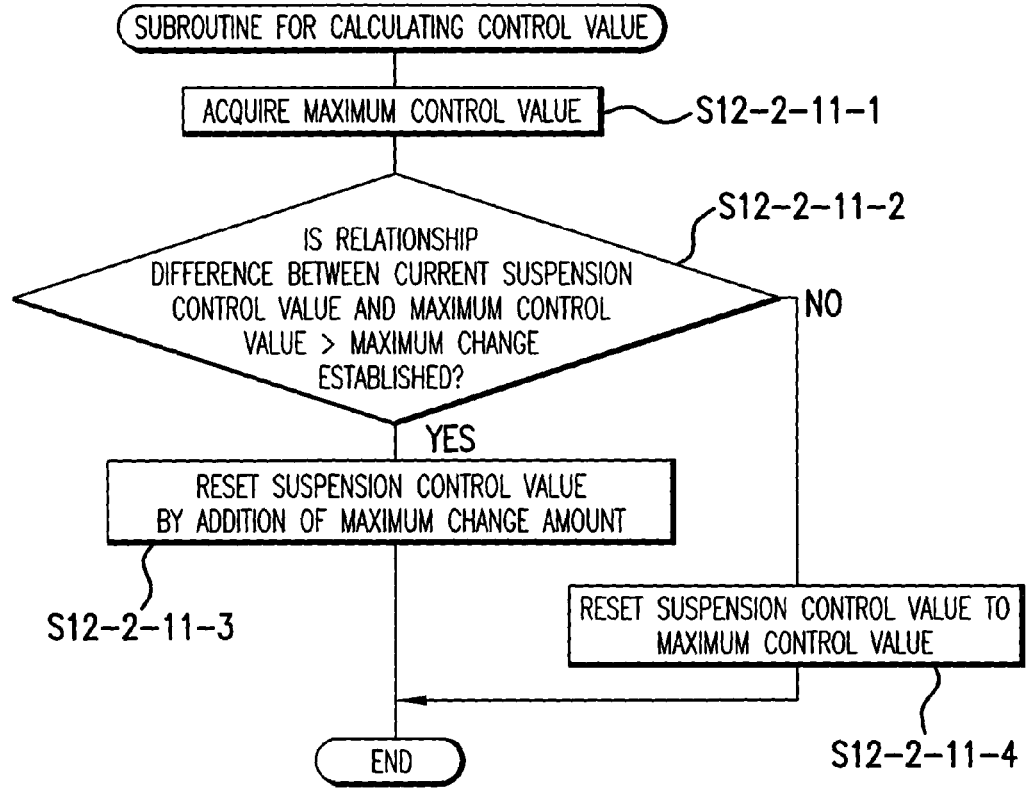
FIG. 31 is a flow chart of the subroutine of step S12-2-11 (FIG. 29) for calculating the control value according to the preferred embodiment of the present invention.

In the subroutine illustrated in FIG. 31 the suspension control unit 30 first acquires the maximum control value (step S12-2-11-1). Subsequently, it determines whether or not the difference between the current suspension control value and the maximum control value is larger than the maximum change amount (step S12-2-11-2). In the case that the difference is larger, the suspension control unit 30 adjusts the current suspension control value by adding to it the maximum change amount value upon each update (renewal) of the current position, and finishes execution of the subroutine (step S12-2-11-3). Further, in the case that the difference is not larger, the suspension control unit 30 resets the suspension control value to the maximum control value upon each update (renewal) of the current position, and finishes the subroutine (step S12-2-11-4).

The flow chart of FIG. 31 is summarized as follows.

In step S12-2-11-1, the maximum control value is acquired.

In step S12-2-11-2, it is determined whether or not the difference between the maximum control value and the current suspension control value is larger than the maximum change amount. In the case that the difference between the maximum control value and the current suspension control value is larger than the maximum change amount, the routine proceeds to step S12-2-11-3. In the case that the difference between the maximum control value and the current suspension control value is equal to or smaller than the maximum change amount, the routine proceeds to step S12-2-11-4.

In step S12-2-11-3, the value obtained by adding the maximum change amount to the current suspension control value is set as the suspension control value at every current position renewing time, and the processing is finished.

In step S12-2-11-4, the suspension control value is reset to the maximum control value upon each updating (renewal) of the current position and execution of the subroutine is finished.

Figure 32:
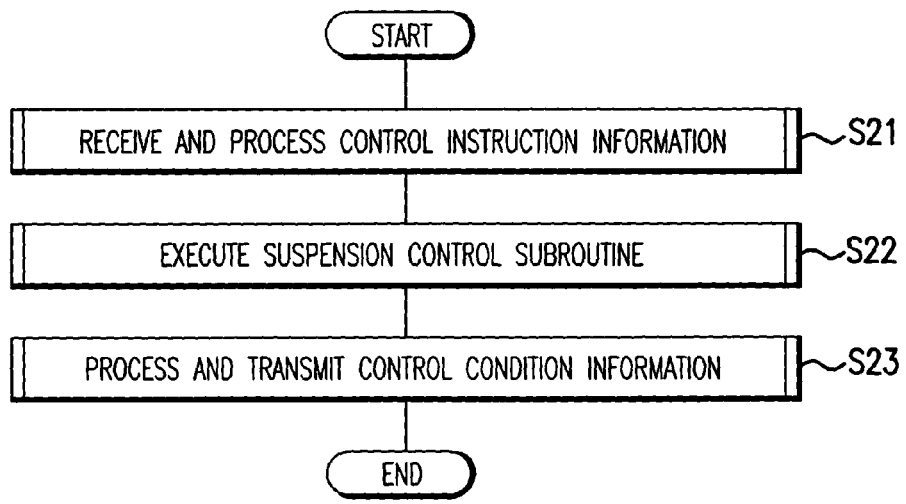
FIG. 32 is a flow chart of a routine for execution of control instructions by the suspension control unit according to the preferred embodiment of the present invention.

The routine executed by the suspension unit 40 is illustrated by the flowchart of FIG. 32.

In executing the control routine illustrated in FIG. 32 the suspension unit 40 first receives control instruction information, such as the control instruction from the suspension control unit 30, and processes same (S21). Subsequently, the suspension unit 40 executes suspension control in accordance with the control instruction (S22). The suspension unit 40 then processes control condition information, including the control results detected by various sensors such as the vertical acceleration sensor 41, and transmits same to the suspension control unit 30.

The routine of FIG. 32 is summarized as follows.

In step S21, the control instruction is received and processed.

In step S22, the suspension control subroutine is executed.

In step S23, the control condition information is processed and transmitted and the routine is finished.

Figure 33:
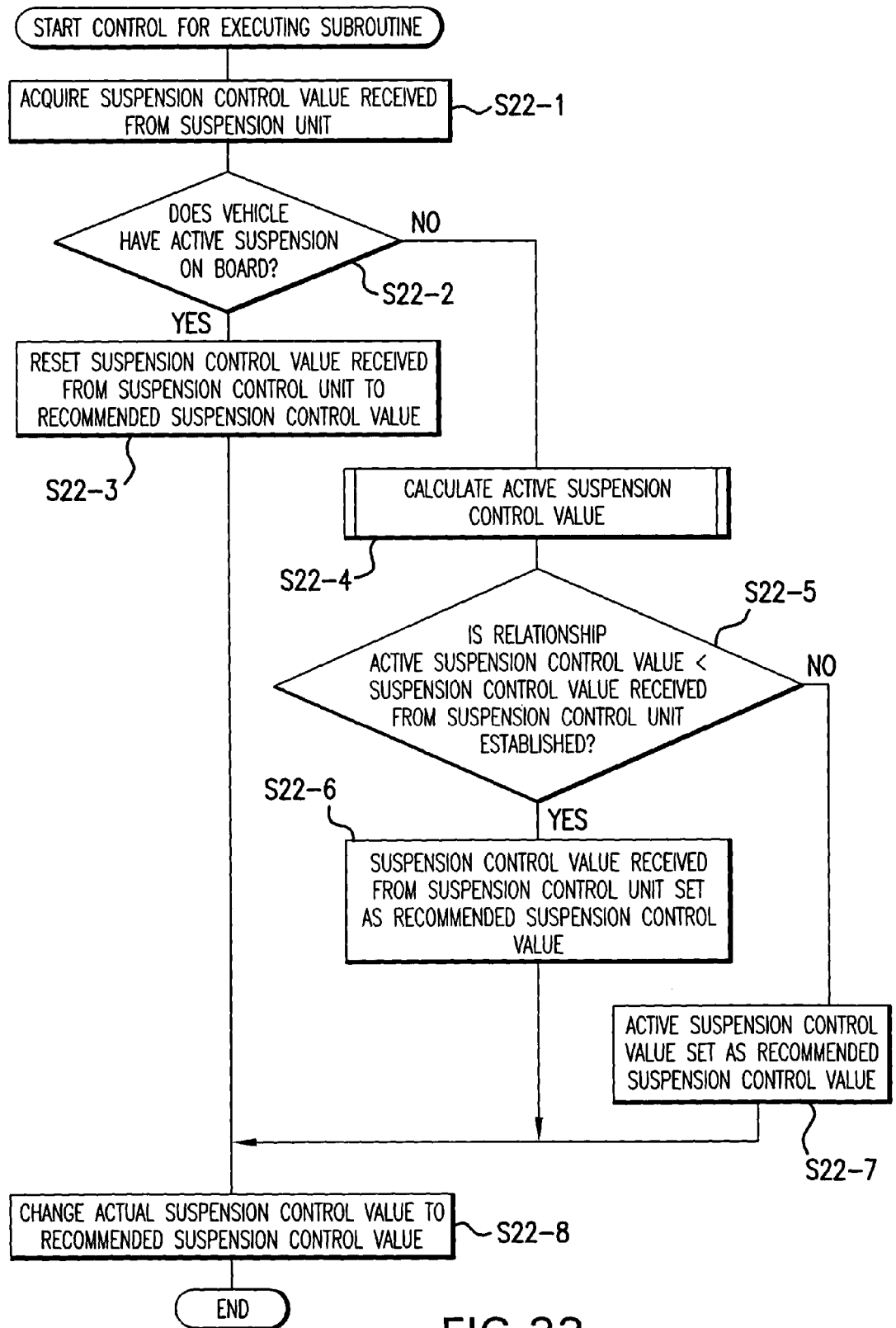
FIG. 33 is a flow chart of the subroutine of step S22 (FIG. 32) for control execution processing according to the preferred embodiment of the present invention.

The suspension control subroutine (step S22 in FIG. 32) is illustrated as a flow chart in FIG. 33. In the suspension control subroutine, the suspension unit 40 determines whether or not the vehicle 11 is equipped with an active suspension, that is, whether or not the suspension unit 40 itself is a suspension unit in an active suspension system which can recognize the current road surface profile and vibration from various sensors and automatically change the suspension control value.

The suspension unit 40 first acquires the suspension control value received from the suspension control unit 30 (S22-1). Subsequently, it determines whether or not the vehicle 11 is equipped with an active suspension system (S22-2). In the case that the vehicle 11 is not equipped with an active suspension, it sets the suspension control value received from the suspension control unit 30 to a recommended suspension control value corresponding to an actual suspension control target (S22-3).

In the case that the vehicle 11 is equipped with an active suspension, the suspension unit 40 calculates an active suspension control value (S22-4). In this case the suspension unit 40, based on actual, current information for road surface state and the current vibration received from the various sensors, calculates an optimum suspension control value for use as an active suspension control value. Subsequently, the suspension unit 40 determines whether or not the active suspension control value is smaller than the suspension control value received from the suspension control unit 30 (S22-5). In the case that the active suspension control value is smaller, the suspension unit 40 sets the suspension control value received from the suspension control unit 30 as a recommended suspension control value. Further, in the case that the active suspension control value is not smaller, the suspension unit 40 sets the active suspension control value as the recommended suspension control value.

Finally, the suspension unit 40 changes the actual suspension control value to the recommended suspension control value (S22-8), and finishes execution of the suspension control subroutine.

The flow chart of FIG. 33 is summarized as follows.

In step S22-1, the suspension control value received from the suspension control unit 30 is acquired.

In step S22-2, it is determined whether or not the vehicle is equipped with an active-suspension system. If the vehicle is so equipped, the subroutine proceeds to step S22-3. In the case that the vehicle is not so equipped, the subroutine proceeds to step S22-4.

In step S22-3, the suspension control value received from the suspension control unit 30 is reset to the recommended suspension control value.

In step S22-4, the active suspension control value is calculated.

In step S22-5, it is determined whether or not the active suspension control value is smaller than the suspension control value received from the suspension control unit 30. In the case that it is smaller, the routine proceeds to step S22-6. In the case that it is not smaller, the routine proceeds to step S22-7.

In step S22-6, the suspension control value received from the suspension control unit 30 is set as the recommended suspension control value.

In step S22-7, the active suspension control value is set as the recommended suspension control value.

In step S22-8, the actual suspension control value is changed to the recommended suspension control value, and the processing is finished.

As mentioned above, in accordance with the present embodiment, the suspension control unit 30 is structured so as to calculate the road surface vibration frequency and the road surface amplitude based on the vertical acceleration of the vehicle acquired from the vertical acceleration sensor 41, to determine the road surface profile based on the road surface vibration frequency and the road surface amplitude, and to determine a suspension control value based on the road surface profile.

Accordingly, it is possible to divide the road surface profile into the elements of road surface vibration frequency and road surface amplitude, or into road surface wavelength and road surface amplitude so as to store them in the memory means, whereby it is possible to execute fine-tuned suspension control. Further, since it is possible to utilize a road surface profile which is not restricted to a vehicle state such as the vehicle weight and/or the vehicle speed, it is possible to execute precise suspension control, and it is possible to share the same road surface profile information among a plurality of vehicles.

Further, the suspension control unit 30 learns the road surface profile, and controls the suspension in advance based on the learned road surface profile. Accordingly, even if a time lag exists in the motion of the suspension unit 40, it is possible to execute a suspension control suitable for the road surface profile. Further, it is possible to execute the control so that passengers in the vehicle do not feel a sense of discomfort.

As described in the foregoing, a suspension control apparatus according to a first aspect of the present invention has a vertical acceleration sensor for detecting a vertical acceleration of the vehicle; and a control unit for determining a road surface profile by estimating waves and irregularities in the road surface based on the vertical acceleration of the vehicle detected by the vertical acceleration sensor, and determining a suspension control value based on the road surface profile. Accordingly, it is possible to properly execute the suspension control tailored to a specific, actual road surface profile, by executing the suspension control based on information obtained for the actual road surface profile.

A suspension control apparatus according to the first aspect may be structured such that the control unit estimates the waves and the irregularities in of the road surface based on the vehicle speed and the vehicle weight of the vehicle. Accordingly, it is possible to properly determine the road surface profile.

A suspension control apparatus according to a second aspect of the present invention has a vertical acceleration sensor for detecting a vertical acceleration of the vehicle; a vehicle speed sensor for detecting the vehicle speed; a weight sensor for detecting the vehicle weight; and a control unit for determining a road surface profile by estimating waves and irregularities in the road surface based on the vertical acceleration of the vehicle detected by the vertical acceleration sensor, the vehicle speed detected by the vehicle speed sensor and the vehicle weight detected by the weight sensor, and determining a suspension control value based on the thus determined road surface profile. Accordingly, in accordance with the second aspect also, it is possible to properly execute suspension control tailored to the actual road surface profile.

A suspension control apparatus according to the second aspect of the present invention may further include current position detecting means for detecting current position of the vehicle, in which the control unit learns the road surface profile, and controls the suspension based on the learned road surface profile ahead of the current position of the vehicle. Accordingly, it is possible to properly execute suspension control based on the learned road surface profile.

A suspension control apparatus according to the present invention may be structured such that the control unit changes the suspension control value to a value suitable for the rough road section before the vehicle has entered the rough road section. Accordingly, even if a time lag exists in the motion of the suspension, it is possible to execute a suspension control suitable for the road surface profile.

A suspension control apparatus according to the present invention may be structured such that the control unit changes the suspension control value from the value suitable for the rough road section after the vehicle has passed the rough road section. Accordingly, even if a time lag exists in the motion of the suspension, suitable suspension control is executed until the vehicle has completely passed the section of rough road.

A suspension control apparatus for a vehicle according to the present invention may be structured such that the control unit changes the suspension control value to a value suitable for a section imparting to the vehicle a great level of vibration when the vehicle is traveling on a rough road section and before the vehicle has entered the section imparting the higher ("great") vibration level. Accordingly, even if a time lag exists in the motion of the suspension, suitable suspension control is executed when the vehicle enters the section having the higher vibration level.

A suspension control apparatus according to the present invention may be structured such that the control unit changes the suspension control value from the value suitable for the section having the higher level of vibration ("great vibration") when the vehicle is traveling on a rough road section and has passed the section having the higher level of vibration. In this case also, even if a time lag exists in the motion of the suspension, suitable suspension control is executed until the vehicle has completely passed the section having the higher vibration level. A suspension control apparatus according to the present invention may be structured such that control unit controls suspension strength by controlling a damping force or a spring rate. Accordingly, since the suspension is controlled to have hardness suitable for the road surface profile, the passenger in the vehicle does not feel a sense of discomfort.

A suspension control apparatus according to a third aspect of the present invention includes current position detecting means for detecting a current position of a vehicle; communication means for receiving a road surface profile of a registered road section from an information providing server; and a control unit for determining a suspension control value based on the road surface profile received by the communication means.

Accordingly, even on a road section which the vehicle has not previously traveled, it is possible to properly control the suspension based on the road surface profile received from the information providing server, and drivability is thereby improved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A suspension control apparatus for a vehicle comprising:
    a vertical acceleration sensor for detecting a vertical acceleration of a vehicle; and
    a control unit for determining a road surface profile by estimating wavelength and amplitude of irregularities of the road surface based on the vertical acceleration of the vehicle detected by said vertical acceleration sensor, and determining a suspension control value based on said road surface profile, wherein said control unit changes said suspension control value to a value suitable for a rough road section before said vehicle has entered the rough road section.

2. The suspension control apparatus for a vehicle according to claim 1, wherein said control unit estimates the wavelength and amplitude of the irregularities of the road surface further based on the vehicle speed and the weight of the vehicle.

3. The suspension control apparatus for a vehicle according to claim 1, wherein said control unit changes said suspension control value from the value suitable for the rough road section after said vehicle has passed out of the rough road section.

4. The suspension control apparatus for a vehicle according to claim 1, wherein said control unit changes said suspension control value to a value suitable for a road section causing a vibration level greater than that produced by the rough road section the vehicle is currently traveling and before the vehicle has entered the section causing the greater vibration level.

5. The suspension control apparatus for a vehicle according to claim 4, wherein said control unit changes said suspension control value from the value suitable for the section causing the greater vibration level when said vehicle is traveling a rough road section after the vehicle has passed out of the section causing the greater vibration level.

6. The suspension control apparatus for a vehicle according to claim 1, wherein said control unit controls suspension of the vehicle by controlling a damping force or a spring rate.

7. The suspension control apparatus for a vehicle according to claim 1, further comprising:
    current position detecting means for detecting a current position of the vehicle,
    wherein said control unit learns said road surface profile, and controls the suspension based on the learned road surface profile ahead of the current position of the vehicle.

8. A suspension control apparatus for a vehicle comprising:
    a vertical acceleration sensor for detecting a vertical acceleration of the vehicle;
    a vehicle speed sensor for detecting a vehicle speed;
    a weight sensor for detecting a vehicle weight; and
    a control unit for determining a road surface profile by estimating wavelength and amplitude of irregularities of a road surface based on the vertical acceleration of the vehicle detected by said vertical acceleration sensor, the vehicle speed detected by said vehicle speed sensor and the vehicle weight detected by said weight sensor, and for determining a suspension control value based on said road surface profile.

9. The suspension control apparatus for a vehicle according to claim 8, further comprising:
    current position detecting means for detecting a current position of the vehicle,
    wherein said control unit learns said road surface profile, and controls the suspension based on the learned road surface profile ahead of the current position of the vehicle.

10. The suspension control apparatus of a vehicle according to claim 8, wherein said control unit changes said suspension control value to a value suitable for a rough road section before the vehicle has entered the rough road section.

11. The suspension control apparatus of a vehicle according to claim 10, wherein said control unit changes said suspension control value from the value suitable for the rough road section after the vehicle has passed out of the rough road section.

12. The suspension control apparatus of a vehicle according to claim 10, wherein said control unit changes said suspension control value to a value suitable for a section causing a greater level of vibration than the rough road section, when the vehicle is traveling on the rough road section and before the vehicle has entered the section causing the greater vibration level.

13. The suspension control apparatus of a vehicle according to claim 12, wherein said control unit changes said suspension control value from the value suitable for the section causing the greater vibration level when the vehicle is traveling on a rough road section after said vehicle has passed out of the section causing the greater vibration level.

14. The suspension control apparatus of a vehicle according to claim 8, wherein said control unit controls suspension of the vehicle by controlling a damping force or a spring rate.

15. A suspension control method for a vehicle comprising:
detecting a vertical acceleration of the vehicle;
determining a road surface profile by estimating wavelength and amplitude of irregularities of a road surface based on the detected acceleration of the vehicle in the vertical direction;
determining a suspension control value based on said road surface profile; and
changing the suspension control value to a value suitable for a rough road section before the vehicle has entered the rough road section.

16. A suspension control method for a vehicle comprising:
detecting a vertical acceleration of the vehicle;
detecting the vehicle speed;
detecting the vehicle weight; and
determining a road surface profile by estimating wavelength and amplitude of irregularities of the road surface based on the detected vertical acceleration, the detected vehicle speed and the detected vehicle weight, and
determining a suspension control value based on said road surface profile.

* * * * *